(12) United States Patent
Chen et al.

(10) Patent No.: US 11,412,363 B2
(45) Date of Patent: Aug. 9, 2022

(54) CONTEXT-ADAPTIVE RSSI-BASED MISBEHAVIOR DETECTION

(71) Applicant: QUALCOMM Incorporated, San Diego, CA (US)

(72) Inventors: Cong Chen, Shrewsbury, MA (US); Jonathan Petit, North Reading, MA (US); Mohammad Raashid Ansari, Andover, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/099,327

(22) Filed: Nov. 16, 2020

(65) Prior Publication Data
US 2022/0159440 A1 May 19, 2022

(51) Int. Cl.
*H04W 4/90* (2018.01)
*H04B 17/318* (2015.01)
*H04W 4/029* (2018.01)
*H04W 4/40* (2018.01)

(52) U.S. Cl.
CPC ............ *H04W 4/90* (2018.02); *H04B 17/318* (2015.01); *H04W 4/029* (2018.02); *H04W 4/40* (2018.02)

(58) Field of Classification Search
CPC ......... H04W 4/90; H04W 4/029; H04W 4/40; H04W 17/318; H04W 72/02
USPC ........................................................ 370/329
See application file for complete search history.

(56) References Cited

U.S. PATENT DOCUMENTS

| 2017/0365171 | A1* | 12/2017 | Haran | G08G 1/096791 |
| 2018/0083914 | A1* | 3/2018 | Yamaura | H04W 12/121 |
| 2019/0164423 | A1* | 5/2019 | Bai | G08G 1/096791 |
| 2019/0312896 | A1 | 10/2019 | Petit et al. | |

(Continued)

OTHER PUBLICATIONS

Kamel J., et al.,"Simulation Framework for Misbehavior Detection in Vehicular Networks", IEEE Transactions on Vehicular Technology, vol. 69, No. 6, Jun. 2020, pp. 6631-6643, DOI 10.1109/TVT.2020.2984878.

(Continued)

*Primary Examiner* — CongVan Tran
(74) *Attorney, Agent, or Firm* — Weaver Austin Villeneuve & Sampson LLP

(57) ABSTRACT

Aspects relating to abnormal transmission identification include, for example, a method involving, at a receiving device, receiving a plurality of V2X messages from a plurality of transmitting devices, obtaining a plurality of RSSI-to-distance data pairs, including an RSSI-to-distance data pair for each of the plurality of V2X messages, establishing an RSSI-to-distance relationship model based, at least in part, on the plurality of RSSI-to-distance data pairs. The method further involves, at the receiving device, receiving an additional V2X message from a transmitting device different from the plurality of transmitting devices, obtaining an additional RSSI-to-distance data pair for the additional V2X message, and comparing the additional RSSI-to-distance data pair to the RSSI-to-distance relationship model. The method further involves, in response to determining that the additional RSSI-to-distance data pair fails a criterion for conforming to the RSSI-to-distance relationship model, identifying the additional V2X message as an abnormal transmission.

26 Claims, 12 Drawing Sheets

(56) References Cited

U.S. PATENT DOCUMENTS

| | | | | |
|---|---|---|---|---|
| 2019/0356677 | A1* | 11/2019 | Naserian | G01S 3/14 |
| 2019/0373609 | A1* | 12/2019 | Kim | H04W 36/06 |
| 2020/0229206 | A1* | 7/2020 | Badic | H04W 28/0226 |
| 2020/0267692 | A1* | 8/2020 | Wu | H04L 5/0091 |
| 2020/0280827 | A1* | 9/2020 | Fechtel | H04W 4/40 |
| 2020/0327343 | A1* | 10/2020 | Lund | G06K 9/00825 |
| 2021/0014831 | A1* | 1/2021 | Ryu | H04W 72/042 |

OTHER PUBLICATIONS

So S., et al., "Physical Layer Plausibility Checks for Misbehavior Detection in V2X Networks", WiSec'19, May 15-17, 2019, 10 pages.

Abumansoor O., et al., "A Secure Cooperative Approach for Nonline-of-Sight Location Verification in VANET", IEEE Transactions on Vehicular Technology, IEEE, USA, vol. 61, No. 1, Jan. 1, 2012 (Jan. 1, 2012), pp. 275-285, XP011397245, ISSN: 0018-9545, DOI:10.1109/TVT.2011.2174465, paragraph [OOOI]—paragraph [OVII].

International Search Report and Written Opinion—PCT/US2021/051905—ISA/EPO—dated Jan. 4, 2022.

Kihei B., et al. "Improved 5.9GHz V2V Short Range Path Loss Model", 2015 IEEE 12th International Conference on Mobile AD HOC and Sensor Systems, IEEE, Oct. 19, 2015 (Oct. 19, 2015), pp. 244-252, XP032845664, DOI: 10.1109/MASS.2015.84 [retrieved on Dec. 28, 2015] p. 6, paragraph B.

Yao Y., et al., "Multi-Channel Based Sybil Attack Detection in Vehicular Ad Hoc Networks Using RSSI", IEEE Transactions on Mobile Computing, IEEE Service Center, Los Alamitos, CA, US, vol. 18, No. 2,Feb. 1, 2019 (Feb. 1, 2019), pp. 362-375, XP011696628, ISSN: 1536-1233, DOI:10.1109/TMC.2018.2833849 [retrieved on Jan. 7, 2019] the whole document.

* cited by examiner

| Type | Description | Size (byte) |
|---|---|---|
| DSRCmsgID | Data elements used in each message to define the Message type | 1 |
| MsgCount | It can check the flow of consecutive messages having the same DSRCmsgID received from the same message sender. | 1 |
| TemporaryID | Represents a 4-byte temporary device identifier. When used in a mobile OBU device, this value is periodically changed to ensure anonymity. | 4 |
| Dsecond | Represents two bytes of time information. | 2 |
| Latitude | Represents the geographic latitude of an object. | 4 |
| Longitude | Represents the geographic longitude of an object. | 4 |
| Elevation | Represents an altitude measured by the WGS84 coordinate system. | 2 |
| PositionAccuracy | Various quality parameters used to model the positioning accuracy for each given axis. | 4 |
| TransmissionAndSpeed | Represents the speed of the vehicle. | 2 |
| Heading | The current direction value is expressed in units of 0.0125 degrees. | 2 |
| SteeringWheelAngle | Represents the current steering angle of the steering wheel. | 1 |
| AccelerationSet4Way | It consists of three orthogonal directions of acceleration and yaw rate. | 7 |
| BrakeSystemStatus | Represents a data element that records various control states related to braking of the vehicle. | 2 |
| VehicleSize | Represents the length and width of the vehicle. | 3 |

FIG. 2

| Timestamp | HvLatDeg | HvLongDeg | RvLatDeg | RvLongDeg | Context | RSSI | RSSIvsDistanceState |
|---|---|---|---|---|---|---|---|
| 2019/12/27-22:43:40.395 | 36.138247 | -115.15487 | 36.1388631 | -115.15487 | Highway | -40.234 | RSSI_VS_DISTANCE_MISMATCH |
| 2019/12/27-22:43:40.496 | 36.138262 | -115.15487 | 36.1388785 | -115.15487 | Urban | -80.23542 | RSSI_VS_DISTANCE_MISMATCH |
| 2019/12/27-22:43:40.597 | 36.1382769 | -115.15487 | 36.1388937 | -115.15487 | Highway | -40.234 | RSSI_VS_DISTANCE_MISMATCH |
| 2019/12/27-22:43:40.697 | 36.1382919 | -115.15487 | 36.1389084 | -115.15487 | Highway | -40.234 | RSSI_VS_DISTANCE_MISMATCH |
| 2019/12/27-22:43:40.798 | 36.1383069 | -115.15487 | 36.1389228 | -115.15487 | Urban | -80.23542 | RSSI_VS_DISTANCE_MISMATCH |
| 2019/12/27-22:43:40.898 | 36.1383218 | -115.15487 | 36.1389368 | -115.15487 | Urban | -80.23542 | RSSI_VS_DISTANCE_MISMATCH |
| 2019/12/27-22:43:40.999 | 36.1383368 | -115.15487 | 36.1389504 | -115.15487 | Urban | -80.23542 | RSSI_VS_DISTANCE_MISMATCH |
| 2019/12/27-22:43:41.099 | 36.1383518 | -115.15487 | 36.1389637 | -115.15487 | Highway | -40.234 | RSSI_VS_DISTANCE_MISMATCH |
| 2019/12/27-22:43:41.200 | 36.1383668 | -115.15487 | 36.1389766 | -115.15487 | Highway | -40.234 | RSSI_VS_DISTANCE_MISMATCH |
| 2019/12/27-22:43:41.300 | 36.1383817 | -115.15487 | 36.1389891 | -115.15487 | Highway | -40.234 | RSSI_VS_DISTANCE_MISMATCH |
| 2019/12/27-22:43:41.400 | 36.1383967 | -115.15487 | 36.1390012 | -115.15487 | Urban | -80.23542 | RSSI_VS_DISTANCE_MISMATCH |
| 2019/12/27-22:43:41.501 | 36.1384117 | -115.15487 | 36.1390131 | -115.15487 | Urban | -80.23542 | RSSI_VS_DISTANCE_MISMATCH |
| 2019/12/27-22:43:41.602 | 36.1384267 | -115.15487 | 36.1390245 | -115.15487 | Urban | -80.23542 | RSSI_VS_DISTANCE_MISMATCH |
| 2019/12/27-22:43:41.702 | 36.1384416 | -115.15487 | 36.1390355 | -115.15487 | Urban | -80.23542 | RSSI_VS_DISTANCE_MISMATCH |
| 2019/12/27-22:43:41.803 | 36.1384566 | -115.15487 | 36.1390462 | -115.15487 | Highway | -40.234 | RSSI_VS_DISTANCE_MISMATCH |
| 2019/12/27-22:43:41.903 | 36.1384716 | -115.15487 | 36.1390566 | -115.15487 | Highway | -40.234 | RSSI_VS_DISTANCE_MISMATCH |
| 2019/12/27-22:43:42.004 | 36.1384865 | -115.15487 | 36.1390665 | -115.15487 | Highway | -40.234 | RSSI_VS_DISTANCE_MISMATCH |
| 2019/12/27-22:43:42.104 | 36.1385015 | -115.15487 | 36.139076 | -115.15487 | Highway | -40.234 | RSSI_VS_DISTANCE_MISMATCH |
| 2019/12/27-22:43:42.204 | 36.1385165 | -115.15487 | 36.1390853 | -115.15487 | Highway | -40.234 | RSSI_VS_DISTANCE_MISMATCH |
| 2019/12/27-22:43:42.304 | 36.1385614 | -115.15487 | 36.1391107 | -115.15487 | Highway | -40.234 | RSSI_VS_DISTANCE_MISMATCH |

FIG. 10

CONTEXT-ADAPTIVE RSSI-BASED MISBEHAVIOR DETECTION

BACKGROUND

Various aspects of the disclosure relate to misbehavior detection in the context of vehicle-to-everything (V2X) communications. V2X is broad term describing a class of technology that allows a vehicle to communicate with other entities, and vice versa. V2X may encompass specific types of communication such as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G). By enabling vehicles and infrastructure to share information such as vehicular type, speed, location, trajectory, traffic signal status, timing, etc., V2X can significantly improve road safety and traffic efficiency. However, V2X systems can be vulnerable to misbehavior such as location spoofing, which can cause artificial traffic congestion and pose other safety hazards. Misbehavior detection based solely on application layer data can often be circumvented by software algorithms. There is a significant need for improved techniques for misbehavior detection in V2X communications.

BRIEF SUMMARY

Aspects relating to abnormal transmission identification are disclosed. In one example, a method involves, at a receiving device, receiving a plurality of V2X messages from a plurality of transmitting devices. The method further involves obtaining a plurality of RSSI-to-distance data pairs, including an RSSI-to-distance data pair for each of the plurality of V2X messages. The method further involves establishing an RSSI-to-distance relationship model based, at least in part, on the plurality of RSSI-to-distance data pairs. The method further involves, at the receiving device, receiving an additional V2X message from a transmitting device different from the plurality of transmitting devices. The method further involves obtaining an additional RSSI-to-distance data pair for the additional V2X message. The method further involves comparing the additional RSSI-to-distance data pair to the RSSI-to-distance relationship model. The method further involves, in response to determining that the additional RSSI-to-distance data pair fails a criterion for conforming to the RSSI-to-distance relationship model, identifying the additional V2X message as an abnormal transmission.

In another example, a method involves, at a receiving device, receiving a plurality of V2X messages from a plurality of transmitting devices. The plurality of V2X messages may correspond to a plurality of RSSI-to-distance data pairs, including an RSSI-to-distance data pair for each of the plurality of V2X messages. The plurality of RSSI-to-distance data pairs may correspond to an RSSI-to-distance relationship model. The method further involves, at the receiving device, receiving an additional V2X message from a transmitting device different from the plurality of transmitting devices. The additional V2X message corresponds to an additional RSSI-to-distance data pair, and the additional RSSI-to-distance data pair fails a criterion for conforming to the RSSI-to-distance relationship model. The method further involves, at the receiving device, identifying the additional V2X message as an abnormal transmission.

In another example, an apparatus includes a receive radio unit configured to receive a plurality of V2X messages from a plurality of transmitting devices and receive an additional V2X message from a transmitting device different from the plurality of transmitting devices. The apparatus further includes one or more processors configured to obtain a plurality of RSSI-to-distance data pairs, including an RSSI-to-distance data pair for each of the plurality of V2X messages. The one or more processors are further configured to establish an RSSI-to-distance relationship model based, at least in part, on the plurality of RSSI-to-distance data pairs, obtain an additional RSSI-to-distance data pair for the additional V2X message, and compare the additional RSSI-to-distance data pair to the RSSI-to-distance relationship model. The one or more processors are further configured to, in response to determining that the additional RSSI-to-distance data pair fails a criterion for conforming to the RSSI-to-distance relationship model, identify the additional V2X message as an abnormal transmission.

In yet another example, a system includes means for, at a receiving device, receiving a plurality of V2X messages from a plurality of transmitting devices. The system further includes means for obtaining a plurality of RSSI-to-distance data pairs, including an RSSI-to-distance data pair for each of the plurality of V2X messages. The system further includes means for establishing an RSSI-to-distance relationship model based, at least in part, on the plurality of RSSI-to-distance data pairs. The system further includes means for, at the receiving device, receiving an additional V2X message from a transmitting device different from the plurality of transmitting devices. The system further includes means for obtaining an additional RSSI-to-distance data pair for the additional V2X message. The system further includes means for comparing the additional RSSI-to-distance data pair to the RSSI-to-distance relationship model. The system further includes means for, in response to determining that the additional RSSI-to-distance data pair fails a criterion for conforming to the RSSI-to-distance relationship model, identifying the additional V2X message as an abnormal transmission.

BRIEF DESCRIPTION OF THE DRAWINGS

Aspects of the disclosure are illustrated by way of example. In the accompanying figures, like reference numbers indicate similar elements.

FIG. 2 presents an illustrative format of a Basic Safety Message (BSM), which is an example a type of V2X communication that may be sent between entities in environment and used by a receiving device for abnormal transmission identification, according to one embodiment of the disclosure.

FIG. 10 is an example of a log file 1000 generated by a host vehicle listing details associated with BSM messages that have been identified as abnormal transmissions.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
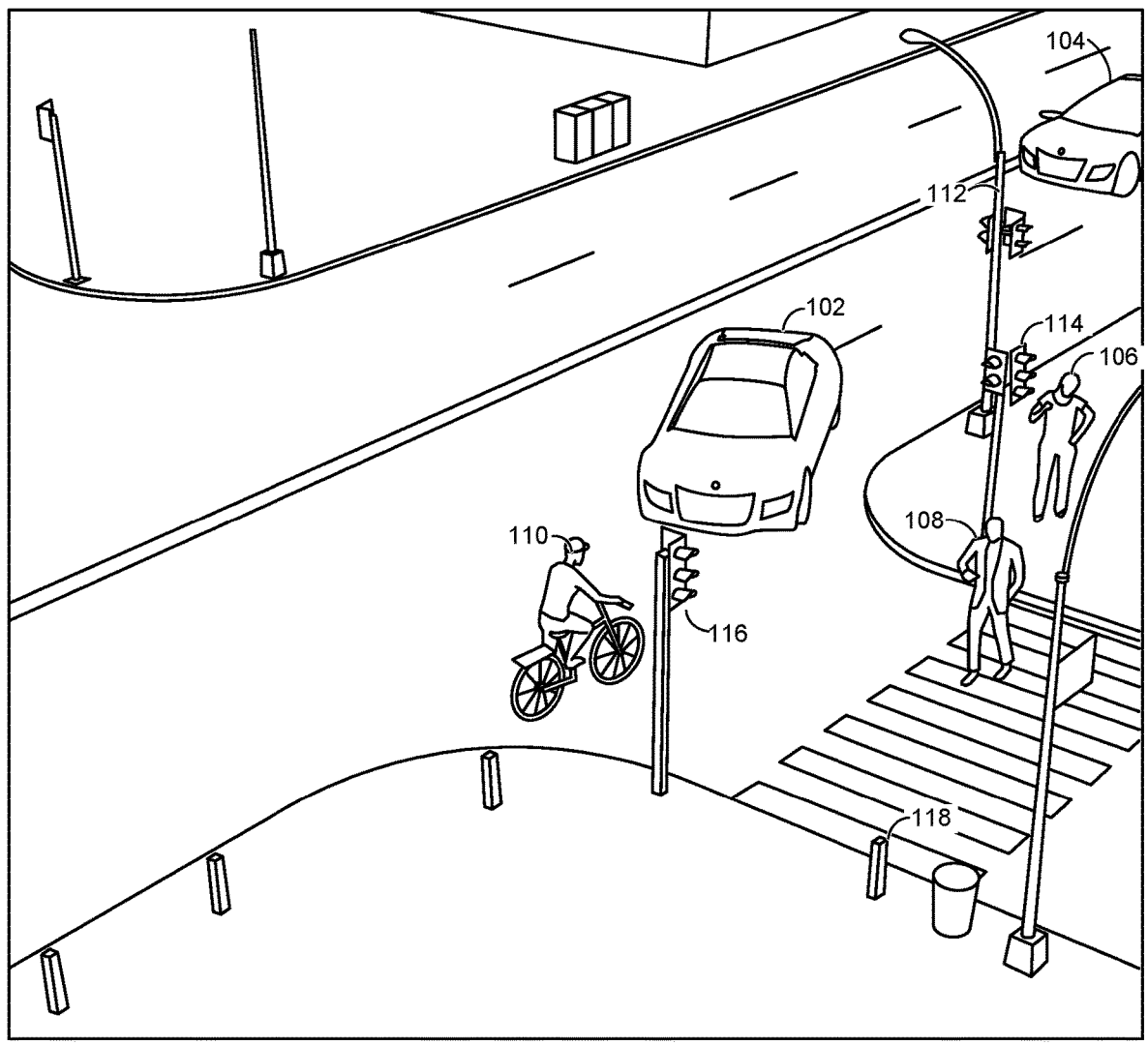
FIG. 1 shows an example of a V2X environment that may incorporate one or more embodiments of the present disclosure.

FIG. 1 shows an example of a V2X environment 100 that may incorporate one or more embodiments of the present disclosure. As shown, environment 100 may comprise a number of different entities, including vehicles 102 and 104, pedestrians 106, 108, and 110, and infrastructure components 112 (signal light), 114 (signal light), 116 (signal light), and 118 (crosswalk sensor). These entities may engage in V2X communications with one another to implement improved road safety and traffic efficiency. A receiving device receiving V2X communications, such as any of vehicles 102 and 104, pedestrians 106, 108, and 110 (e.g., mobile devices carried by the pedestrians), or infrastructure components 112, 114, 116, and 118, may determine that a particular V2X communication received is an abnormal transmission and thereby conclude that the transmitting device is misbehaving. Such a technique for abnormal transmission identification may involve illustrative steps described below, according to various embodiments of the disclosure.

As described herein, a "receiving device" may refer to a communications device capable of bi-directional communications but whose reception capabilities are being emphasized for purposes of discussion. A receiving device may, but is not required to be, actively performing a reception operation. For example, a receiving device may have performed reception previously, will be performing reception at a later time, may conditionally perform reception based on a condition that may or may not occur, etc. Similarly, a "transmitting device" may refer to a communications device capable of bi-direction communications but whose transmission capabilities are being emphasized for purposes of discussion. Likewise, a transmitting device may, but is not required to be, actively performing a transmission operation. For example, a transmitting device may have performed transmission previously, will be performing transmission at a later time, may conditionally perform transmission based on a condition that may or may not occur, etc.

For example, the technique may comprise, at the receiving device, receiving a plurality of first V2X messages from a plurality of first transmitting devices. For example, the receiving device may be vehicle 102. The first plurality of V2X messages from the plurality of first transmitting devices may include, for instance, a V2X message sent from pedestrian 110, a V2X message sent from vehicle 104, and a V2X message sent from infrastructure component 112. The technique may further comprise, for each first V2X message of the plurality of first V2X messages, obtaining an RSSI-to-distance data pair comprising (1) a received signal strength indicator (RSSI) value and (2) a distance measure associated with an estimated distance between the receiving device and a corresponding first transmitting device of the first V2X message, to form a plurality of RSSI-to-distance data pairs for the plurality of first V2X messages. The technique may further comprise, based on the plurality of RSSI-to-distance data pairs for the plurality of first V2X messages, selecting a predetermined RSSI-to-distance relationship model from a plurality of predetermined RSSI-to-distance relationship models. The technique may further comprise, at the receiving device, receiving a second V2X message from a second transmitting device different from the first plurality of transmitting devices. For example, the second V2X message from the second transmitting device may be a V2X message sent from pedestrian 108. The technique may further comprise obtaining an RSSI-to-distance data pair for the second V2X message comprising (1) an RSSI value and (2) a distance measure associated with an estimated distance between the receiving device and the second transmitting device. The technique may further comprise determining that the RSSI-to-distance data pair for the second V2X message fails a criterion for conforming to the selected, predetermined RSSI-to-distance relationship model. Finally, the technique may comprise identifying the second V2X message as an abnormal transmission based at least in part on the determining that the RSSI-to-distance data pair for the second V2X message fails the criterion for conforming to the selected, predetermined RSSI-to-distance relationship model. In this manner, vehicle 102 may determine that the V2X message received from pedestrian 108 is an abnormal transmission, which may be deemed to be misbehavior within the V2X environment.

FIG. 2 presents an illustrative format of a Basic Safety Message (BSM), which is an example a type of V2X communication that may be sent between entities in environment 100 and used by a receiving device for abnormal transmission identification, according to one embodiment of the disclosure. A BSM message, whose use is in V2X communications is prevalent in locations such as the United States, is described here for illustrative purposes. Other types of messages that may be used can include, for example, Cooperative Awareness Message (CAM) or Decentralized Environmental Notification Message (DENM), whose use in V2X communications is prevalent in locations such as Europe. The use of RSSI values and location data contained within V2X communications for misbehavior detection in accordance with embodiments of the present disclosure is applicable for BSM, CAM, and/or DENM messages. Referring back to the example shown in FIG. 2, the BSM format shown includes data to identify the message and specify the size and type of the message. The BSM format shown also includes data on the location/position of the entity. In this case, location data includes, for example, latitude, longitude, and elevation data. In addition, the BSM format can also include information such as vehicle heading, steering wheel angle, acceleration and yaw rate, brake system status, vehicle size, etc.

Misbehavior within an V2X environment can take the form of BSM messages sent with inaccurate information designed to disrupt traffic, create congestion, or cause some other disruption. For example, a misbehaving entity might send a large number of BSM messages that appear to come from different vehicles (e.g., with different temporary identifiers ("TemporaryIDs"). These BSM messages may contain location and trajectory data indicating a large number of nearby vehicles are all headed toward a particular intersection, when in fact such vehicles do not exist. The sender of these "fake" BSM messages might be a mobile phone on a single user, e.g., pedestrian 108 in FIG. 1. The sender might employ software algorithms to overcome any V2X misbehavior detection systems based solely on application layer data, by employing software algorithms to spoof temporary identifiers, mimic vehicle trajectory data to conform to real-world map coordinates for existing roadways, etc. Thus, the misbehavior being perpetrated might be difficult to detect. According to embodiments of the disclosure, a receiving device may obtain an RSSI-to-distance data pair associated with reception of a particular BSM message, determine whether the RSSI-to-distance data pair passes or fails a criterion for conforming to an expected RSSI-to-distance relationship model, and use such information to conclude whether the V2X communication comprising the BSM message is an abnormal transmission.

Figure 3:
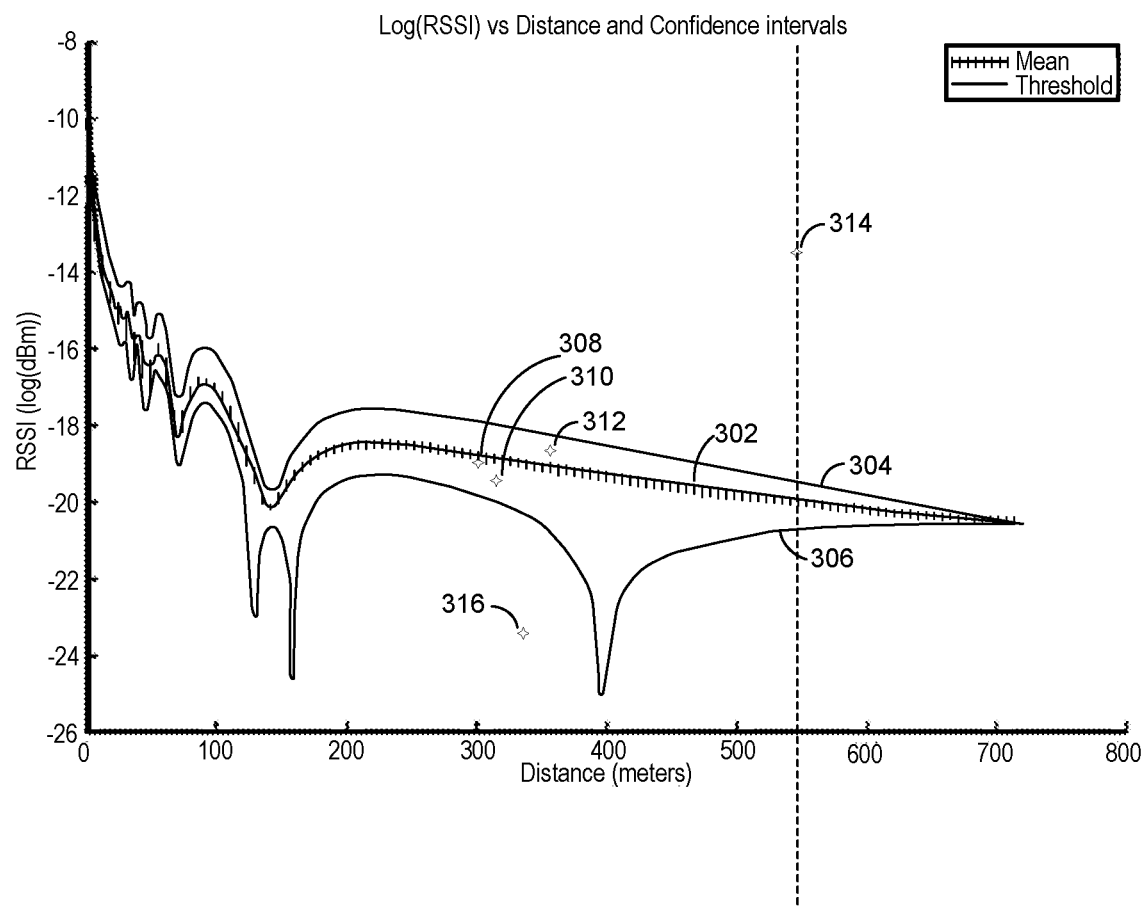
FIG. 3 presents a plot of receive signal strength indicator (RSSI) values versus distance and how such a plot might be used for identification of abnormal V2X transmissions.

FIG. 3 presents a plot of receive signal strength indicator (RSSI) values versus distance and how such a plot might be used for identification of abnormal V2X transmissions. The y-axis represents the RSSI value in logarithmic form, expressed in decibels (dB). The x-axis represents distance expressed in meters. According to embodiments of the present disclosure, the device receiving a BSM message may scrutinize the RSSI value associated with reception of the BSM message and the distance between the sender and the device receiving the BSM message, in order to determine whether the BSM message ought to be identified as an abnormal transmission. As discussed previously with reference to FIG. 2, a BSM message typically includes information pertaining to the location of the sender (e.g., vehicle, pedestrian, infrastructure, etc.) of the BSM message. The sender's location can thus be obtained at the device receiving the BSM message, by parsing the BSM message. The device receiving the BSM message also knows its own location. With knowledge of both locations, the device receiving the BSM message can compute the distance between the sender and the receiving device. At the same time, the device receiving the BSM message can obtain an RSSI value associated with reception of the BSM message (e.g., from the receive radio in the physical layer). The device receiving the BSM message can then evaluate whether the (1) RSSI value associated with reception of the BSM message and (2) computed distance between the sender and the device receiving the BSM message conform to, or fail to conform to, an expected RSSI-to-distance relationship model.

In FIG. 3, curves 302, 304, and 306 represent various attributes of a particular RSSI-to-distance relationship model. These curves may be derived from a distribution of RSSI values that a device receiving a BSM message, for example, might expect to see as a function of distance between the sender and the device receiving the BSM message. Again, a BSM message is described here for illustrative purposes. Other types of messages, including a CAM message or a DENM message, may also be used. Returning to FIG. 3, curve 302 represents the mean RSSI value, curve 304 represents the maximum RSSI value, and curve 306 represents the minimum RSSI value. Here, the "maximum" and "minimum" RSSI values may represent upper and lower thresholds that have been set to establish a range in which RSSI values may be deemed to be acceptable or normal. RSSI values falling outside such a range maybe deemed to be abnormal, e.g., deemed to be sent from a misbehaving sender. Thus, curve 304 (maximum) and curve 306 (minimum) represent an example of a criterion that has been established to determine whether a received V2X message conforms to the RSSI-to-distance relationship model. As can be seen, the expected RSSI value (e.g., curves 302, 304, and 306) generally decreases as the distance between the sender and the receiving device grows. However, the expected RSSI value may not be a strictly decreasing function of distance—i.e. there may be certain intervals in which the expected RSSI value increases with distance. The shape of the RSSI-to-distance relationship can vary depending on the environment and signal paths involved, as discussed in more detail in later sections.

The model for an RSSI-to-distance relationship can range from simple to complex, and it can be expressed in different ways. In the example shown in FIG. 3, a mean curve 302, a maximum curve 304, and a minimum curve 304 are shown. However, measures other than mean, maximum, and minimum can be used. For example, an RSSI-to-distance relationship model can be expressed in terms of a probability distribution function at each distance value. Each probability distribution function may comprise a plurality of frequency bins. Different bin sizes may be implemented. Indeed, measures such as the mean, maximum, and minimum may be derived from the distribution of RSSI values for each distance value. The criterion for evaluating model conformance may be based on such a probability distribution but take forms other than a maximum curve and minimum curve. In addition, while curves 302, 304, and 306 in FIG. 3 appear to reflect data points that are densely spaced over distance, the RSSI-to-relationship model can be realized using data points that are sparsely spaced over distance. Interpolation and smoothing can be applied to "fill in" values between sparsely spaced data points. Finally, data underlying the RSSI-to-distance relationship model may be derived from real-world observations, simulations, calculations, and/or other sources.

Sample points 308, 310, and 312 satisfy a criterion for conforming to the RSSI-to-distance relationship model presented in FIG. 3. Different criteria may be established. Here, the criterion comprises a simple requirement that at the particular distance value associated with the sample point, the observed RSSI value must fall within a range established by the maximum RSSI value curve 304 and the minimum curve 306. For example, sample point 308 corresponds to a BSM message that appears to be a normal V2X transmission. Sample point 308 is shown to have an observed RSSI value of about −19 decibel-milliwatts (dBm) and a distance value of about 300 meters. At the distance value of 300 meters, the maximum expected RSSI value according to curve 304 is about −17.9 dBm, and the minimum expected RSSI value according to curve 306 is about −20 dBm. The observed RSSI value of −19 dBm falls within the range established by the minimum and maximum values, and sample point 308 is deemed to satisfy the criterion for conforming to the RSSI-to-distance relationship model. In a similar manner, sample points 310 and 312 can also be shown to satisfy the criterion for conforming to the RSSI-to-distance relationship model.

By contrast, sample points 314 and 316 fail to satisfy the same criterion for conforming to the RSSI-to-distance relationship model presented in FIG. 3. For example, sample point 314 corresponds to a BSM message that appears to be an abnormal V2X transmission. Sample point 314 is shown to have an observed RSSI value of about −13.6 dBm and a distance value of about 540 meters. At the distance of 540 meters, the maximum expected RSI value according to curve 304 is about −19.5 dBm, and the minimum expected RSSI value according to curve 36 is about −21.6 dBm. Thus, the observed RSSI value of −13.6 dBm falls outside the range established by the maximum and minimum values, and sample point 314 is deemed to not satisfy the criterion for conforming to the RSSI-to-distance relationship model. In a similar manner, sample point 316 can be shown to fail to satisfy the criterion for conforming to the RSSI-to-distance relationship model.

FIG. 3 demonstrates that, once an RSSI-to-distance relationship model is known, it can be used to effectively discriminate between normal and abnormal V2X transmissions. Detecting one or more abnormal transmissions may lead to a conclusion that the sender is misbehaving. However, the V2X environment may not be easily predictable. Indeed, the V2X environment may be dynamic in nature, with entities located in different places and moving in different trajectories. All of this makes it difficult to ascertain a useful RSSI-to-distance relationship model.

Figure 4:
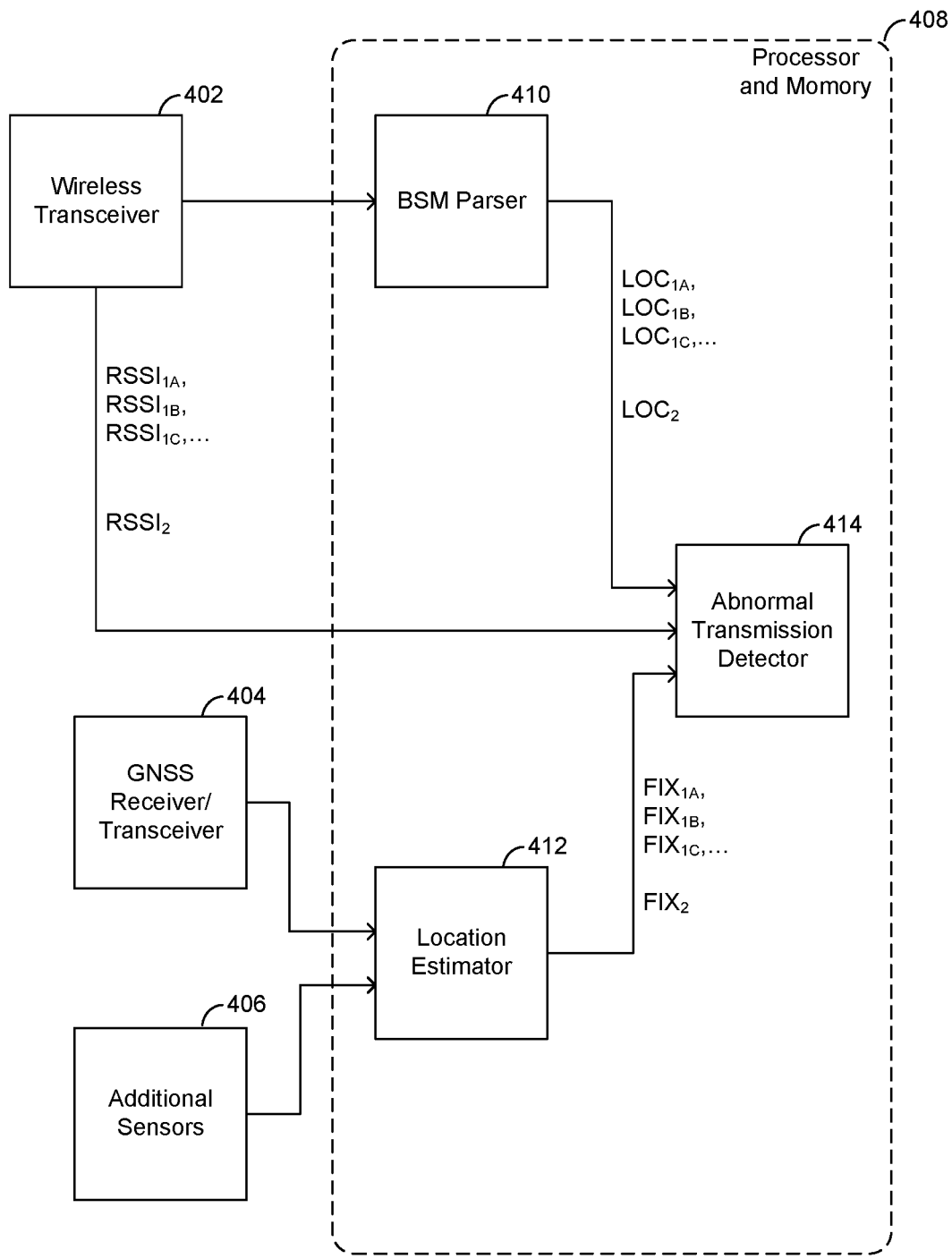
FIG. 4 is a block diagram of illustrative components within a communications device configured to identify abnormal V2X transmissions in the face of aforementioned challenges, according to an embodiment of the disclosure.

FIG. 4 is a block diagram of illustrative components within a communications device 400 configured to identify abnormal V2X transmissions in the face of aforementioned challenges, according to an embodiment of the disclosure. Communications device 400 may be implemented in a vehicle, as a mobile device carried by a pedestrian, as an infrastructure component, etc. For simplicity of illustration, only certain components of the communications device 400 is shown. However, it should be understood that communications device 400 may be part of a device capable of bi-directional V2X communication. In this example, communications device 400 comprises various components such as a receive wireless transceiver 402, a global navigation satellite system (GNSS) receiver/transceiver 404, additional sensors 406, and processor and memory 408, among other components. Processor and memory 408 refers to one or more processors and associated memory that are capable of executing programmed instructions to perform various tasks. The operation of processor and memory 408 may be organized into blocks, which may include a BSM parser 410, a location estimator 412, and an abnormal transmission detector 414. Once again, a BSM message is described here for illustrative purposes. Other types of messages, including a CAM message or a DENM message, may also be used. While only one processor is shown in FIG. 4, the various operations performed by processor and memory 408 may be performed by one or more processors in different embodiments.

According to an embodiment of the disclosure, communications device 400 is capable of receiving a V2X communication and determining whether the V2X communication is an abnormal transmission, utilizing an evaluation against an RSSI-to-distance model selected based on prior V2X communications that communications device 400 has received. In various embodiments, such V2X communications may comprise BSM messages. For example, communications device 400 may have recently received a group of BSM messages, denoted here as $BSM_{1A}$, $BSM_{1B}$, and $BSM_{1C}$, from a first plurality of transmitting devices (e.g., pedestrian 110, vehicle 104, and infrastructure component 112). Wireless transceiver 402 receives and demodulates the radio signals containing messages $BSM_{1A}$, $BSM_{1B}$, and $BSM_{1C}$. In doing so, RX radio 40 generates RSSI values associated with the reception of each BSM message—i.e., $RSSI_{1A}$, $RSSI_{1B}$, and $RSSI_{1C}$—and forwards these RSSI values to the abnormal transmission detector 414.

Wireless transceiver 402 also generates the demodulated baseband data which comprise BSM messages $BSM_{1A}$, $BSM_{1B}$, and $BSM_{1C}$ and forwards the baseband data to the BSM parser 410. BSM parser 410 parses the baseband data, taking into account the applicable BSM message structure, and extracts useful information from each BSM message. The extracted information includes location data such as locations $LOC_{1A}$, $LOC_{1B}$, and $LOC_{1C}$, which correspond to the locations of the senders of BSM messages $BSM_{1A}$, $BSM_{1B}$, and $BSM_{1C}$, respectively. BSM parser 410 forwards locations $LOC_{1A}$, $LOC_{1B}$, and $LOC_{1C}$ to the abnormal transmission detector 414.

GNSS receiver/transceiver/transceiver 404 and additional sensors 406 generate data such as satellite positioning fixes, Wifi-based location fixes, and other sensor-based location data (e.g., camera/image-based location fix) and forward such data to the location estimator 412. Location estimator 412 combines the location data to generate location estimates for communications device 400 itself. Because communications device 400 may be a moving entity, such as a vehicle or a pedestrian, location estimates for communications device 400 may vary over time. Location estimator 412 may generate location estimates, denoted as $FIX_{1A}$, $FIX_{1B}$, and $FIX_{1C}$, corresponding to the location of communications device 400 when it received BSM messages $BSM_{1A}$, $BSM_{1B}$, and $BSM_{1C}$, respectively. Location estimator 412 forwards location estimates $FIX_{1A}$, $FIX_{1B}$, and $FIX_{1C}$ to the abnormal transmission detector 414. Using the aforementioned data collected from various components, the abnormal transmission detector 414 may select an RSSI-to-distance relationship model. The process of selecting the RSSI-to-distance relationship model is described in more detail in later sections.

The selected RSSI-to-distance relationship model may then be used to determine whether a new message, denoted here as $BSM_2$, from a different transmitting device (e.g., pedestrian 108) is a normal or abnormal transmission. Doing so involves generating and forwarding similar data for the new message $BSM_2$. For example, Wireless transceiver 402 may receive $BSM_2$ and generate an RSSI value, $RSSI_2$, associated with reception of $BSM_2$. Wireless transceiver 402 may forward $RSSI_2$ to the abnormal transmission detector 414. Wireless transceiver 402 may also generate the demodulated baseband data comprising message $BSM_2$ and forward the baseband data to BSM parser 410. BSM parser 410 may extract location $LOC_2$, which corresponds to the location of the sender of the message $BSM_2$. BSM parser 410 may forward location $LOC_2$ to the abnormal transmission detector 414. GNSS receiver/transceiver/transceiver 404 and additional sensors 406 may generate various location data to the location estimator 412. Location estimator 412 may use the location data to generate a location estimate $FIX_2$, which corresponds to the location of communications device 400 when it received message $BSM_2$. Location estimator 412 may forward location estimate $FIX_2$ to the abnormal transmission detector 414. Having received $RSSI_2$, $LOC_2$, and $FIX_2$, the abnormal transmission detector 414 may use these values to determine whether $BSM_2$ is a normal or abnormal transmission, utilizing the selected RSSI-to-distance relationship model.

Figure 5:
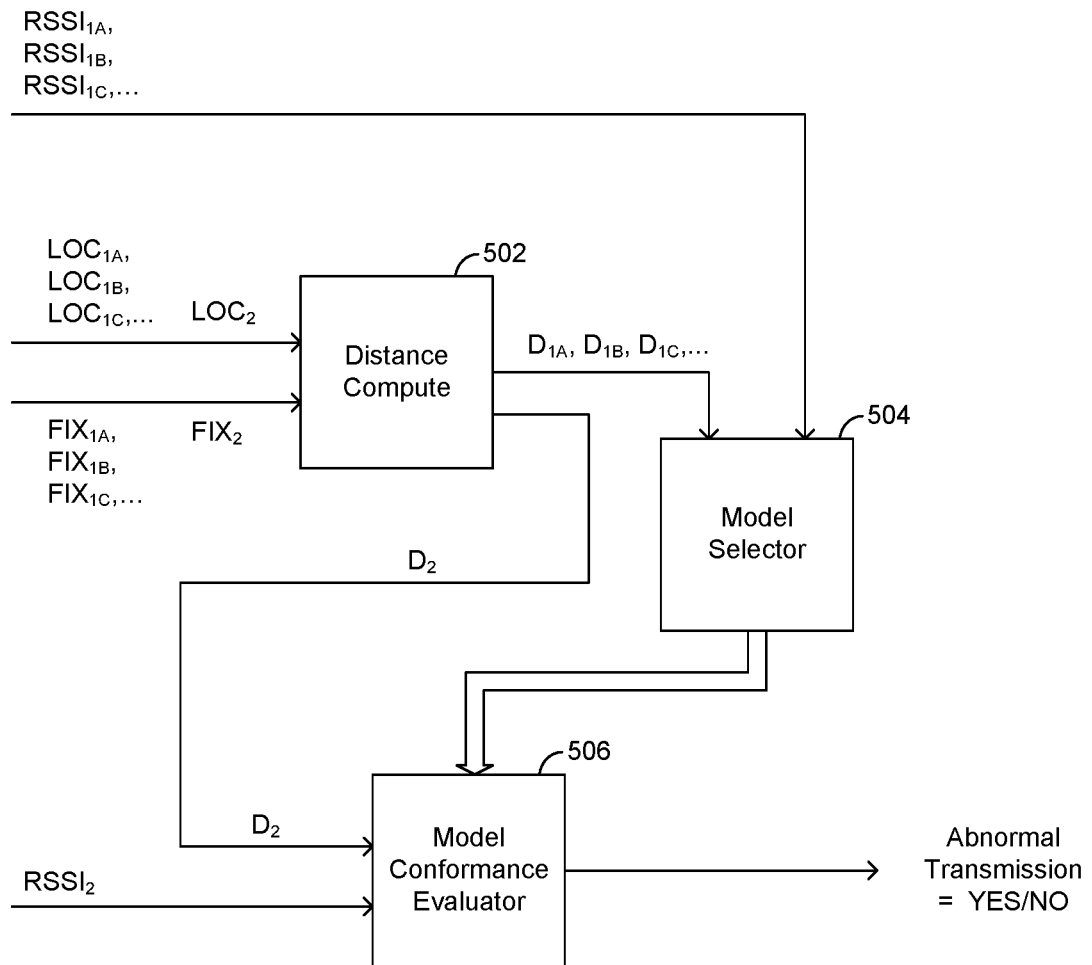
FIG. 5 is a block diagram illustrating operations of an abnormal transmission detector, according to an embodiment of the disclosure.

FIG. 5 is a block diagram illustrating operations of the abnormal transmission detector 414, according to an embodiment of the disclosure. As shown, the abnormal transmission detector 414 may comprise a distance compute block 502, a model selector block 504, and a model conformance evaluator block 506. Distance compute block 502 generally operates by receiving pairs of locations and computing the distance between the pair of locations. For example, distance compute block 502 may receive location $LOC_{1A}$, $LOC_{1B}$, and $LOC_{1C}$, as well as location fixes $FIX_{1A}$, $FIX_{1B}$, and $FIX_{1C}$. Distance compute block 502 may generate distances $D_{1A}$, $D_{1B}$, and $D_{1C}$. $D_{1A}$ corresponds to the distance between $LOC_{1A}$ and $FIX_{1A}$. $D_{1B}$ corresponds to the distance between $LOC_{1B}$ and $FIX_{1B}$. $D_{1C}$ corresponds to the distance between $LOC_{1C}$ and $FIX_{1C}$. Thus, distances $D_{1A}$, $D_{1B}$, and $D_{1C}$ represent the distances of transmission associated with $BSM_{1A}$, $BSM_{1B}$, and $BSM_{1C}$, respectively. Model selector 504 receives the RSSI values $RSSI_{1A}$, $RSSI_{1B}$, and $RSSI_{1C}$, which represent the received signal strengths associated with the reception of $BSM_{1A}$, $BSM_{1B}$, and $BSM_{1C}$, respectively. Based on the three RSSI-to-distance data pairs—i.e., $(RSSI_{1A}, D_{1A})$, $(RSSI_{1B}, D_{1B})$, and $(RSSI_{1C}, D_{1C})$, the model selector 504 selects an RSSI-to-distance relationship model. The model selector 504 may select the RSSI-to-distance relationship model from a plurality of predetermined RSSI-to-distance relationship models. Here, a "predetermined RSSI-to-distance relationship model" is broadly defined to be any model that characterizes a relationship between RSSI values and distance values. Such a model may be "predetermined" in many ways. For example, in one embodiment, the relationship between RSSI values and distance values may be formed as one or more fixed mathematical expressions or constant table look-up values that are determined during the manufacturing or factory programming of the equipment in question, such as the abnormal transmission detector 414. In another embodiment, the relationship between RSSI values and distance values may be determined by machine learning (ML) models whose structure or parameters may be determined during the manufacturing or factory programming of the equipment in question. Such an ML model is still considered to be "predetermined," even if coefficients or other values associated with the ML model may be updated during use (after manufacturing and factory programming), such as through a process involving unsupervised learning.

Figure 6:
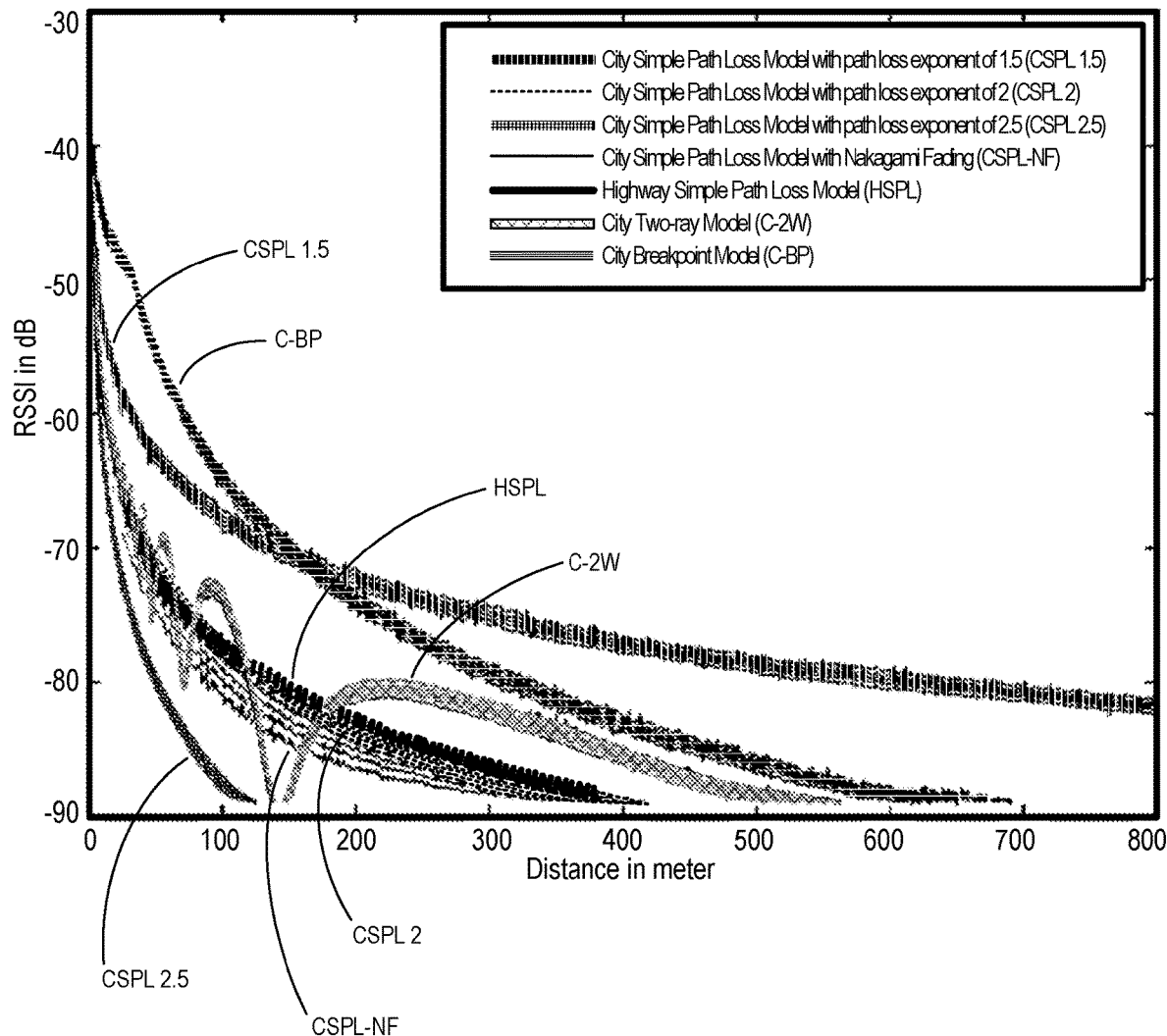
FIG. 6 presents a plurality of predetermined RSSI-to-distance relationship models, according to one embodiment of the disclosure.

FIG. 6 presents a plurality of predetermined RSSI-to-distance relationship models, according to one embodiment of the disclosure. Each model may correspond to a different signal propagation context. In this example, seven predetermined RSSI-to-distance relationship models are shown. These are:
  City Simple Path Loss Model with Path Loss Exponent of 1.5
  City Simple Path Loss Model with Path Loss Exponent of 2.0
  City Simple Path Loss Model with Path Loss Exponent of 2.5
  City Simple Path Loss Model with Nakagami Fading
  Highway Simple Path Loss Model
  City Two-ray Model
  City Breakpoint Model Here, the various City Simple Path Loss models are based on signal propagation environments associated with a city, with obstructions such as buildings, cross traffic, and other entities which can generally add more obstructions and interference to received signals. The City Simple Path Loss models shown correspond to path loss exponents of 1.5, 2.0, and 2.5, respectively. Each path loss exponent represents different extent by which signal strength is expected to decrease exponentially over distance. The City Simple Path Loss Model with Nakagami Fading is a more nuanced model typically associated with multipath scattering with relatively large delay-time spreads, with different clusters of reflected waves, which may be characteristic of interference from multiple sources in a cellular system. The Highway Simple Path Loss Model is based on a signal propagation environment associated with highways, which may be associated with fewer fixed-location obstructions such as buildings. The City Two-ray Model is also based on a signal propagation environment associated with a city. However, at least two distinct signal propagation paths are considered. The two paths may comprise, for example, a direct line-of-sight path and a reflected path, e.g., reflecting off of the road surface. The City Breakpoint Model is also based on a signal propagation environment associated with a city but with a breakpoint at a particular distance. For distances up to the breakpoint, the model may follow one particular fading characteristic, and for distances greater than the breakpoint, the model may follow a different fading characteristic. While seven predetermined RSSI-to-distance relationship models are shown in FIG. 7, a different number of predetermined models may be implemented.

In FIG. 6, each predetermined RSSI-to-distance relationship model is illustrated using a plurality of contour lines. Each RSSI-to-distance relationship model may be viewed as a distribution of RSSI values at each distance value. The plurality of contour lines represent the boundaries of bins associated with the RSSI distribution at each distance. For example, the City Simple Path Loss Model with Path Loss Exponent of 1.5 is illustrated using five contour lines. These five contour lines represent the boundaries of the six bins used to divide the distribution of RSSI values at each distance. While six bins are used to characterize each RSSI-to-distance relationship model in the embodiment shown in FIG. 6, a different number of bins may be used. Also, while contour lines are used to illustrate each RSSI-to-distance relationship model in the embodiment shown, different measures may be used in other embodiments. While FIG. 6 appears to reflect data points that are densely spaced over distance, each RSSI-to-relationship model can be represented using data points that are sparsely spaced over distance. Interpolation and smoothing can be applied to "fill in" values between sparsely spaced data points. Again, data underlying each RSSI-to-distance relationship model may be derived from real-world observations, simulations, calculations, and/or other sources.

Returning to FIG. 5, model selector block 504 may perform a fit test, in order to determine which one of the seven predetermined RSSI-to-distance relationship models best fits a set of RSSI-to-distance observations associated with a plurality of first transmitting devices—e.g., data pairs $(RSSI_{1A}, D_{1A})$, $(RSSI_{1B}, D_{1B})$, and $(RSSI_{1C}, D_{1C})$. According to a specific embodiment, a chi-square test (also known as $\chi^2$ test) is used as the fit test. The chi-square test is a statistical hypothesis test used to determine whether there is a statistically significant difference between a set of observations and a plurality hypothesized distributions. Typically, the chi-square test yields a set of P-values. Each P-value represents the degree to which the observation is deemed a good "fit" with a hypothesized distribution. A lower P-value corresponds to a better fit, and a higher P-value corresponds to a weaker fit. While a chi-square test is described here for illustrative purposes, other types of fit tests may be used in accordance with various embodiments of the disclosure.

Figure 7:
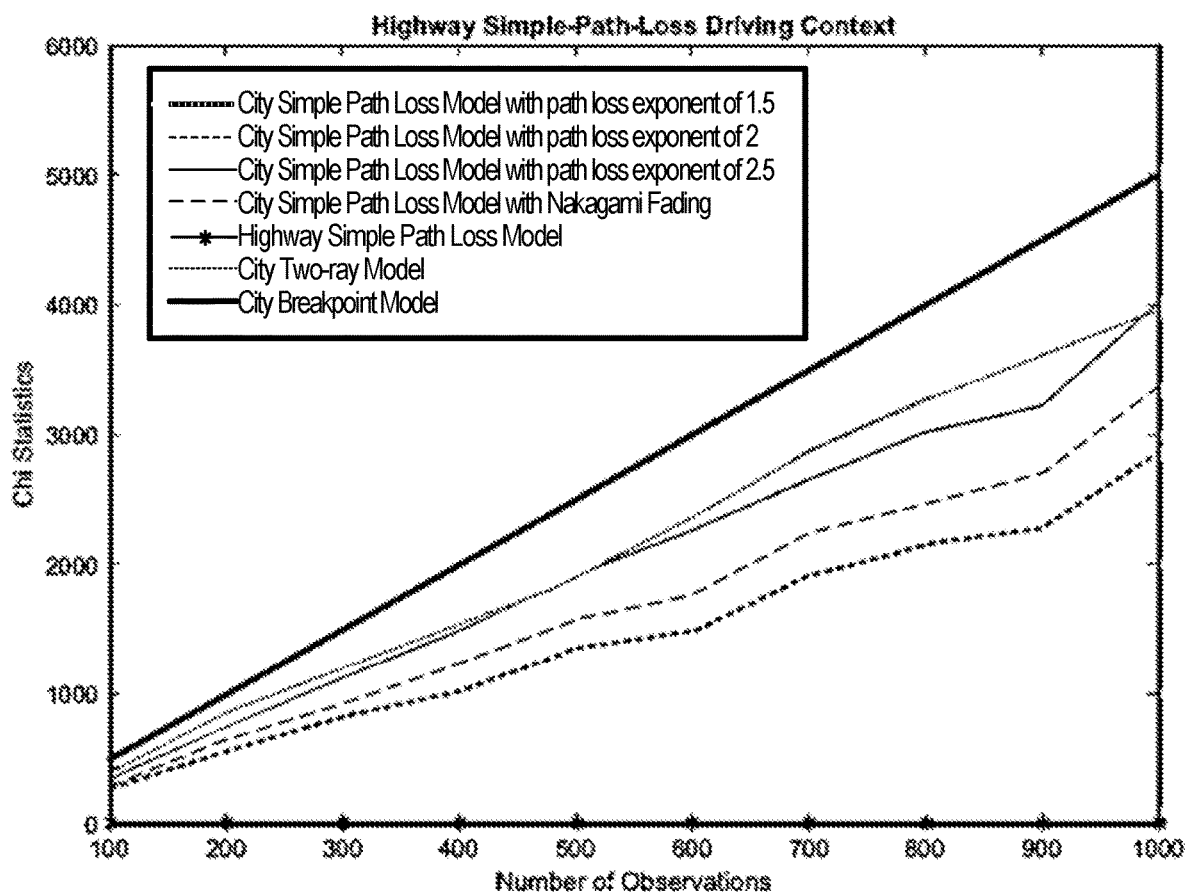
FIG. 7 shows the results of a chi-square test performed to fit a first set of RSSI-to-distance observations to each of seven predetermined RSSI-to-distance relationship model shown in FIG. 6.

FIG. 7 shows the results of a chi-square test performed to fit a first set of RSSI-to-distance observations to each of the seven predetermined RSSI-to-distance relationship models shown in FIG. 6. For example, the first set of RSSI-to-distance observations may be made on a morning of a Monday. The RSSI-to-distance observations may comprise a first instance of the data pairs ($RSSI_{1A}$, $D_{1A}$), ($RSSI_{1B}$, $D_{1B}$), and ($RSSI_{1C}$, $D_{1C}$). The y-axis represents the magnitude of the chi statistic generated, which may comprise the P-values from the chi-square test. Here, seven different chi-square test outcomes are plotted, one for each of the seven predetermined RSSI-to-distance relationship models. As can be seen, six of the models yield P-values that are significant in magnitude and grow with distance. By contrast, one model, the Highway Simple Path Loss Model, yields P-values that stay relatively close to zero, over a range of distances. The notably low P-values indicate a very good fit of the first set of RSSI-to-distance observations to the Highway Simple Path Loss Model. Thus, model selector 504 may select the Highway Simple Path Loss Model on this Monday morning.

Figure 8:
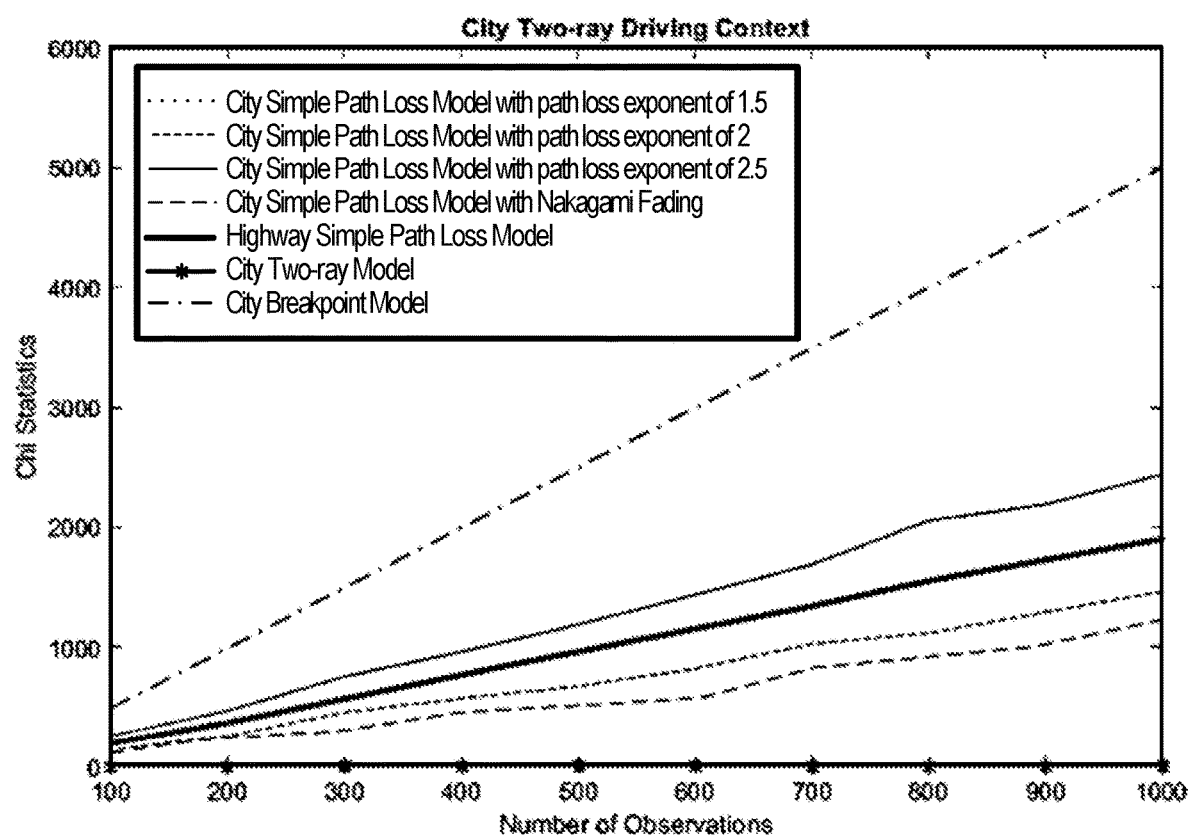
FIG. 8 shows the results of a chi-square test performed to fit a second set of RSSI-to-distance observations to each of seven predetermined RSSI-to-distance relationship model shown in FIG. 6.

FIG. 8 shows the results of a chi-square test performed to fit a second set of RSSI-to-distance observations to each of the seven predetermined RSSI-to-distance relationship model shown in FIG. 6. For example, the first set of RSSI-to-distance observations may be made on the same Monday, but in the afternoon. Again, the RSSI-to-distance observations may comprise a second instance of the data pairs ($RSSI_{1A}$, $D_{1A}$), ($RSSI_{1B}$, $D_{1B}$), and ($RSSI_{1C}$, $D_{1C}$). The y-axis represents the magnitude of the chi statistic generated, which may comprise the P-values from the chi-square test. Once again, seven different chi-square test outcomes are plotted, one for each of the seven predetermined RSSI-to-distance relationship models. As can be seen, six of the models yield P-values that are significant in magnitude and grow with distance. By contrast, one model, the City Two-ray Model, yields P-values that stay relatively close to zero, over a range of distances. The notably low P-values indicate a very good fit of the first set of RSSI-to-distance observations to the City Two-ray Model. Thus, model selector 504 may select the City Two-ray Model on this Monday afternoon.

The Monday morning versus Monday afternoon examples shown in FIGS. 7 and 8, respectively, illustrate the adaptive nature of the disclosed technique. The selection of the RSSI-to-distance relationship model is based on recent RSSI-to-distance observations. The signal propagation environment may change, as time elapses, as the V2X receiving device moves to different locations, and/or as surrounding V2X entities or other entities move or change their behavior. By selecting an appropriate RSSI-to-distance relationship model based on recent observations, the V2X receiving device may flexibly adapt to the signal propagation environment as it evolves. The frequency and timing with which the model selector 504 selects a new model may depend on implementation. In some embodiments, model selection may be performed on a fixed, periodic schedule. For example, it may be performed every M minutes. In other embodiments, model selection may be triggered based on one or more events, such as an indication that the V2X receiving device has moved to a different location. In yet other embodiments, model selection may be performed based on a combination of factors including time, location, and/or other considerations.

Returning to FIG. 5, the model conformance evaluator block 506 receives the selected RSSI-to-distance relationship model from the model selection block 504. This may be done in different ways. For example, the model selection block 504 may forward actual data characterizing the distribution of the selected model, such as the contour lines corresponding to the selected, predetermined RSSI-to-distance relationship model shown in FIG. 6, to the model conformance evaluator block 506. In a different example, each predetermined RSSI-to-distance relationship model may be associated with an index, for example, and the model selection block 504 may simply forward the index (e.g., "5") associated with the selected RSSI-to-distance relationship model (e.g., Highway Simple Path Loss Model) to the model conformance evaluator block 506.

Next, the model conformance evaluator block 506 evaluates an RSSI-to-distance data pair, e.g., ($RSSI_2$, $D_2$) shown in FIG. 5, corresponding to a second V2X message (e.g., $BSM_2$) from a second transmitting device against the selected model, to determine whether a criterion for conforming to the selected model is met or has failed. An example of such a criterion is whether the RSSI-to-distance data pair fits within a range of acceptable RSSI values established by a maximum and a minimum RSSI curve, such as that shown in FIG. 3. Thus, the conformance evaluator block 506 may determine whether the $RSSI_2$ value falls within a range of acceptable RSSI values between the maximum RSSI value and minimum RSSI value defined for distance $D_2$, according to the selected RSSI-to-distance relationship model (e.g., Highway Simple Path Loss Model). If the criterion is met, then the second V2X message may be identified as a normal V2X transmission. If on the other hand the RSSI-to-distance data pair fails the criterion, then the second V2X message may be identified as an abnormal V2X transmission.

According to various embodiments, the disclosed techniques exhibit an inherent tamper-resistant characteristic. As discussed, model selection may be based on RSSI-to-distance observations made on a plurality of first V2X messages (e.g., $BSM_{1A}$, $BSM_{1B}$, and $BSM_{1C}$) from a plurality of first transmitting devices (e.g., pedestrian 110, vehicle 104, and infrastructure component 112). Evaluation for abnormal V2X transmission, in turn, may be based on an RSSI-to-distance observation made for a second V2X message (e.g., $BSM_2$) from a second transmitting device (e.g., pedestrian 108) different from the plurality of first transmitting devices. Furthermore, the plurality of first transmitting devices may also represent a diversified group of transmitting devices, further enhancing the tamper-resistant nature of the technique. Thus, the disclosed techniques make it more difficult for the misbehaving transmitting device to influence the selection of the RSSI-to-distance relationship model. It is more likely that other V2X transmitting devices, those that are not misbehaving, would influence the selection of RSSI-to-distance relationship model—i.e., the "baseline" for what is considered to be a normal RSSI-to-distance relationship. Once the RSSI-to-distance relationship model is reliably selected, the misbehaving V2X transmitting device can be identified as abnormal for deviating from the selected model.

Another benefit of the disclosed techniques is that utilize data that may be readily available from an existing communications system. For example, RSSI values such as $RSSI_{1A}$, $RSSI_{1B}$, $RSSI_{1C}$, and $RSSI_2$ for BSM messages may already be available from hardware such as blockwireless transceiver 402 shown in FIG. 4. Location data for the transmitting device typically exist as part of the standard BSM message format, so location data such as $LOC_{1A}$, $LOC_{1B}$, $LOC_{1C}$, and $LOC_2$ may already be available and can be parsed from incoming BSM messages. Likewise, the location fix data for the wireless transceiver 402 itself, such as $FIX_{1A}$, $FIX_{1B}$, $FIX_{1C}$, and $FIX_2$ may already be available from position determining equipment such as GNSS receiver/transceiver/transceiver 404, additional sensors 406, etc. already present in the communications device 400. Thus, it is likely that no additional equipment may be needed to implement the aforementioned techniques for identification of abnormal transmissions, according to embodiments of the present disclosure.

Figure 9A:
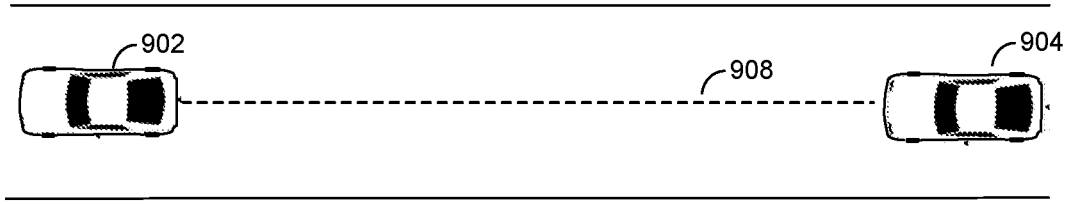
FIG. 9A illustrates an unobstructed scenario 900 for V2X signal propagation between two devices.

FIG. 9A illustrates an unobstructed scenario 900 for V2X signal propagation between two devices. Here, a vehicle 902 may transmit a V2X message, e.g., a BSM message, to another vehicle 904. There is a direct, unobstructed line-of-sight (LOS) path from the vehicle 902 to the vehicle 904. As such, the V2X message may be sent from the vehicle 902 to the vehicle 904 without effects of obstruction. Other environmental conditions may still impact the propagation of the V2X signal. For instance, if the roadway is a city street versus a highway, the signal propagation channel may differ. If the environment exhibits a two-ray propagation or breakpoint-type propagation behavior, the signal propagation channel may also differ. Thus, the vehicle 904 may apply the techniques described herein to select an RSSI-to-distance relationship model from a plurality of predetermined RSSI-to-distance relationship models (e.g., FIGS. 5 and 6), e.g., by performing a "fit" test to find the most likely model. The vehicle 904 may evaluate the RSSI and distance values associated with the V2X message received from the vehicle 902 against the selected RSSI-to-distance relationship model to determine whether the V2X message received from the vehicle 902 is an abnormal transmission. While FIG. 9A illustrates an example of two vehicles as the transmitting device and receiving device, the scenario may apply to other types of devices such as other vehicles, pedestrian user equipment, RSUs, other types of device, or any combination thereof.

Figure 9B:
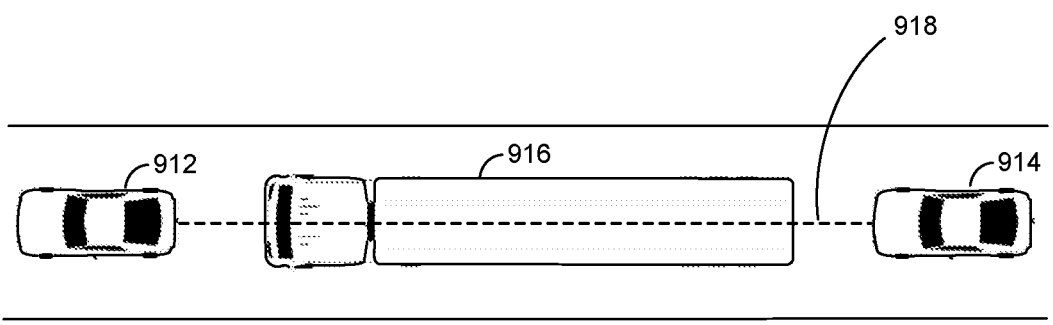
FIG. 9B illustrates an obstructed scenario 910 for V2X signal propagation between two devices.

FIG. 9B illustrates an obstructed scenario 910 for V2X signal propagation between two devices. Once again, a vehicle 912 may transmit a V2X message, e.g., a BSM message, to another vehicle 914. In this case, however, a large truck 916 is positioned between the vehicle 912 and the vehicle 914. The large truck 916 blocks a direct LOS path 918 between the vehicle 912 and the vehicle 914 and complicates the process of finding a "fit" to select an RSSI-to-distance relationship model and using the selected model to determine whether the V2X message received from the vehicle 912 is an abnormal transmission.

According to certain embodiments, the vehicle 914 may improve abnormal transmission detection performance by using one or more sensors to recognize the presence of an intervening obstruction and, in response, modifying the operation to select and/or apply the RSSI-to-distance relationship model, in order to determine whether the V2X message from the vehicle 912 is an abnormal transmission. In such embodiments, a first step may involve detecting, at the vehicle 914, the presence of the large truck 918 between the vehicle 912 and the vehicle 914. For example, the vehicle 914 may utilize one or more cameras aboard the vehicle 914 to capture images in the relevant direction. In this case, the vehicle 914 may use one or more forward-facing cameras to capture images in the direction of the vehicle 912. The vehicle 914 may utilize object detection (e.g., machine learning-based detection) to detect the large truck 916 within the captured images.

The vehicle 914 may also utilize available information regarding the estimated position(s) of surrounding vehicles, along with sensor readings, to aid in deciphering the obstructed scenario 910. For instance, the vehicle 914 may receive a broadcast BSM message from the vehicle 912 that includes the vehicle type and GPS coordinates of the vehicle 912. Similarly, the vehicle 914 may receive a broadcast BSM message from the large truck 916 that includes the vehicle type and GPS coordinates of the large truck 916. Based on such GPS coordinates, the vehicle 914 may be able to link the object, i.e., large truck, detected in images captured by one or more cameras as the large truck identified in the relevant BSM message received. Based on captured images, position data such as GPS coordinates, vehicle type information, and/or other information obtained, the vehicle 914 may determine an object in the vicinity of the vehicle 912 and/or the vehicle 914. For example, the vehicle 914 may determine that the object is positioned between the vehicle 912 and the vehicle 914. In a specific example, the vehicle 914 may determine whether a detected object is blocking a LOS path between the vehicle 912 and the vehicle 912. Use of additional information such as BSM messages can thus refine the sensor-based detection of an obstruction such as the vehicle 916.

Additionally or alternatively, the vehicle 914 may utilize other types of sensors in the detection of an intervening object. For example, the vehicle 914 may utilize readings from sensors such as RADAR, LIDAR, accelerometer, steering wheel angle sensor, etc., to determine the position and orientation of other vehicles and the vehicle 914 itself. By combining outputs from multiple ones and/or different types of sensors, the vehicle 914 may improve the detection of any intervening object(s). Also, the vehicle 914 may utilize additional information such as steering wheel angle, speed, acceleration, and other data obtained from BSM messages received from surrounding vehicles. The vehicle 914 may employ the sensor readings and/or received BSM messages to determine how many intervening objects there are and types of intervening objects that are present.

Having detected an object in the vicinity of the vehicle 912 or the vehicle 914, e.g., a large truck 916 obstructing the LOS between the vehicle 912 and the vehicle 914, the vehicle 914 may take a modified approach for abnormal transmission detection. In one embodiment, the vehicle 914 may modify the criterion for conforming to the selected RSSI-to-distance model, in determining whether the V2X message is an abnormal transmission. Referring back to FIGS. 4 and 5, the vehicle 914 may comprise a model conformance evaluator 506, as part of an abnormal transmission detector 414. As previously discussed, the model conformance evaluator 506 may establish a range of RSSI values for any given estimated distance between the transmitting device and the receiving device of the V2X message. The range of RSSI values may be defined by an upper RSSI value and a lower RSSI value, which may be modified in response to detecting the intervening object.

For example, in response to detecting the object in the vicinity of the vehicle 912 or the vehicle 914, e.g., the large truck 916 obstructing the LOS between the vehicle 912 and the vehicle 914, the vehicle 514 may expand the range of RSSI values associated with the criterion for conforming to the selected RSSI-to-distance model. The range of RSSI values may be expanded by defining (1) a revised upper RSSI value higher than the previous upper RSSI value and/or (2) a revised lower RSSI value that is lower than the previous lower RSSI value. For example, the revised upper RSSI value may be increased by a certain amount, e.g., 2 dB to 10 dB, as compared to the previous upper RSSI value. Alternatively or additionally, the revised lower RSSI value may be decreased by a certain amount, e.g., 2 dB to 10 dB, as compared to the previous lower RSSI value. Expanding the RSSI range loosens the conformance criterion, which may accommodate an increase in the variance of the received signal strength that may be associated with the presence of the intervening object. The degree to which the range of RSSI values is expanded may also be modified based on the type and/or number of objects detected. For example, if two large trucks are determined to be obstructing the LOS between the vehicle 912 and the vehicle 914, the revised upper RSSI value may be further increased, and the revised lower RSSI value may be further decreased.

In another example, in response to detecting the object in the vicinity of the vehicle 912 or the vehicle 914, e.g., the large truck 916 obstructing the LOS between the vehicle 912 and the vehicle 914, the vehicle 914 may shift the range of RSSI values associated with the criterion for confirming to the selected RSSI-to-distance model. Here, the vehicle 914 may shift the RSSI range by defining (1) a revised upper RSSI value lower than the previous upper RSSI value and/or (2) a revised lower RSSI value that is lower than the previous lower RSSI value. For example, the revised upper RSSI value may be decreased by a certain amount, e.g., 2 dB to 10 dB, as compared to the previous upper RSSI value. Alternatively or additionally, the revised lower RSSI value may be decreased by a certain amount, e.g., 2 dB to 10 dB, as compared to the previous lower RSSI value. Shifting the RSSI range downward in this manner may accommodate a decrease in the overall received signal strength of the received V2X message, which may be associated with greater attenuation of the signal in the presence of the intervening object. The degree to which the range of RSSI values is shifted may also be modified based on the type and/or number of objects detected. For example, if two large trucks are determined to be obstructing the LOS between the vehicle 912 and the vehicle 914, the revised upper RSSI value may be further decreased, and the revised lower RSSI value may be further decreased.

FIG. 10 is an example of a log file 1000 generated by a host vehicle listing details associated with BSM messages that have been identified as abnormal transmissions. Each row of the log file 1000 corresponds to a BSM message that has been received by a host vehicle from a remote vehicle and identified as being an abnormal transmission. The BSM messages shown may have been transmitted by the same remote vehicle or different remote vehicles. As shown, the log file 1000 includes several columns, including a timestamp column 1002, a host vehicle latitude degree column 1004, a host vehicle longitude degree column 1006, a remote vehicle latitude column 1008, a remote vehicle longitude column 1010, a context column 1012, an received signal strength indicator (RSSI) column 1014, and an RSSI versus distance state column 1016. The log file 1000 may be generated, for example, by an on board unit (OBU) of the host vehicle. The log file 1000 is illustrated only as an example, and other log files generated by a host vehicle or other receiving device may vary in the format and types of information presented.

The log file 1000 contains sufficient information to reveal the manner in which each listed BSM message may have been detected as an RSSI-to-distance mismatch and thus identified as an abnormal transmission. Specifically, an RSSI-to-distance data pair can be derived for each BSM message. For each BSM message, the distance between the host vehicle and the remote vehicle can be computed, based on the location of the host vehicle and the location of the remote vehicle. The host vehicle latitude degree column 1004 and host vehicle longitude degree 1006 column may provide the location of the host vehicle, in terms of a latitude and a longitude estimate, at the time of the reception of the BSM message by the host vehicle. The remote vehicle latitude degree column 1008 and the remote vehicle longitude degree column 1010 may provide the location of the remote vehicle, in term of a latitude and a longitude estimate, at the time of the transmission of the BSM message by the remote vehicle. As discussed previously, the host vehicle may extract such remote vehicle latitude and longitude information from the contents of the BSM message. The RSSI column 1014 provides the measured RSSI values associated with reception of each BSM message. Thus, information provided in the log file 1000 can be used to derive an RSSI-to-distance data pair for each BSM message listed.

The RSSI-to-distance data pair associated with each BSM message may be evaluated to determine whether it meets or fails a criterion for conforming to a known RSSI-to-distance relationship model. For example, referring back to FIG. 3, the RSSI-to-distance relationship model may indicate a conformance range defined by a "maximum" and a "minimum" RSSI value for any given distance. If the RSSI value indicated by the RSSI column 1014 falls outside the conformance range (i.e., greater than the maximum or less than the minimum RSSI value) established for computed distance between the host vehicle and the remote vehicle, it can be concluded that such failure to meet the conformance criterion likely led to the indication an "RSSI_VS DISTANCE_MISMATCH" value in the RSSI versus Distance State column 1016.

Using a log file such as the log file 1000, a receiving device (e.g., a host vehicle) may be tested to determine whether it implements aspects of the present disclosure. For example, the testing scenario may involve transmitting a plurality of V2X messages (e.g., BSM messages) from a plurality of transmitting devices (e.g., one or more remote vehicles) to the receiving device. The receiving device would receive the plurality of V2X messages. The plurality of V2X messages may correspond to a plurality of RSSI-to-distance data pairs, including an RSSI-to-distance data pair for each of the plurality of V2X messages. Each RSSI-to-distance data pair can be carefully controlled. For example, each V2X message may be sent to the receiving device at a precisely adjusted received signal strength. Also, each V2X message (e.g., BSM message) may be formulated to contain a sender location (e.g., latitude and longitude) of the transmitting device that corresponds to a known distance between the receiving device and the transmitting device. The plurality of RSSI-to-distance data pairs may thus be designed to correspond to a known RSSI-to-distance relationship model. Having received such a plurality of V2X messages, a receiving device that implements aspects of the present disclosure would likely select the known RSSI-to-distance relationship model.

Next, the testing scenario may involve transmitting an additional V2X message, from a transmitting device different from the plurality of transmitting devices, to the receiving device. The receiving device would receive the additional V2X mesge. The additional V2X message may corresponds to an additional RSSI-to-distance data pair. Here, the additional RSSI-to-distance data pair may be purposely designed to fail the criterion for conforming to the known RSSI-to-distance relationship model. In response to receiving such an additional V2X message, a receiving device that implements aspects of the present disclosure may be likely to identify the additional V2X message as an abnormal transmission. For example, the receiving device may generate an entry in a log file indicating that an RSSI-versus-distance mismatch has been detected—e.g., an "RSSI_VS DISTANCE_MISMATCH" value in the RSSI versus Distance State column 1016.

Furthermore, context information associated with each BSM message, as reported by the host vehicle, may further confirm the RSSI-to-distance relation model that has been selected by a receiving device such as the host vehicle. As shown, the context column 1012 provides the context, e.g., driving environment, reported by the remote vehicle at the time of the reception of the BSM message. For example, the context column may show a values such as "Highway," "Urban," or other values. The host vehicle may be able obtain its context information from a context detection module, which may use various forms of input to detect the context of the host vehicle. Just as an example, the context detection module may utilize the location of host vehicle and available map information to determine whether the host vehicle is traveling on a highway or in an urban setting. The contexts detection module may also utilize inputs such as available weather information and rain sensor measurements to determine the environmental and road conditions, which can also be taken into account in determining the context. Additional sensor and/or other inputs may further refine the context determination.

Figure 11:
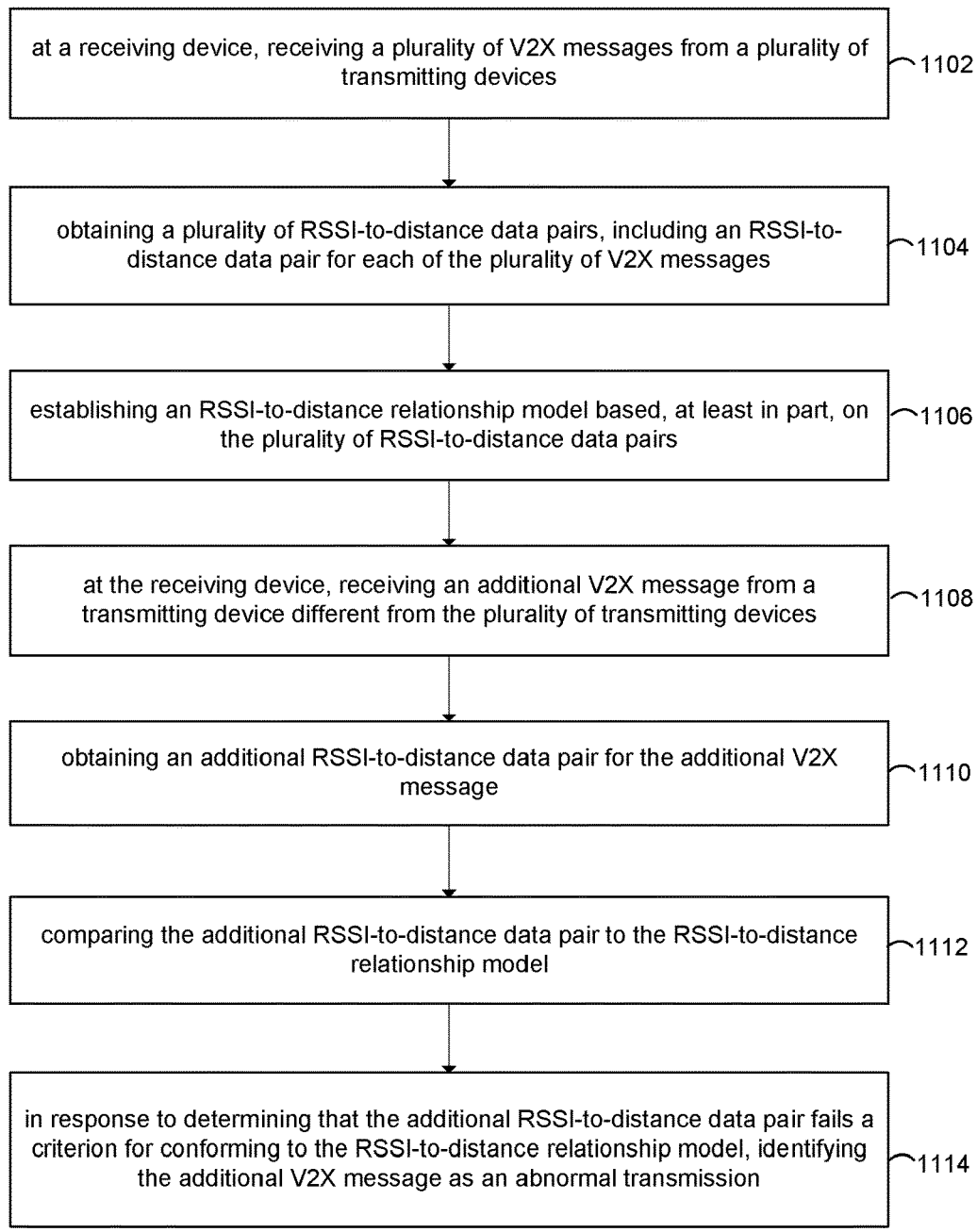
FIG. 11 is a flowchart illustrating a process 1100 for abnormal transmission identification, according to an embodiment of the disclosure.

FIG. 11 is a flowchart illustrating a process 1100 for abnormal transmission identification, according to an embodiment of the disclosure. In a step 1102, at a receiving device, a plurality of V2X messages are received from a plurality of transmitting devices. For example, BSM messages $BSM_{1A}$, $BSM_{1B}$, and $BSM_{1C}$ may be received from pedestrian 110, vehicle 104, and infrastructure component 112 shown in FIG. 1. In a step 1104, a plurality of RSSI-to-distance data pairs are obtained, including an RSSI-to-distance data pair for each of the plurality of V2X messages. For example, three such RSSI-to distance data pairs may be $(RSSI_{1A}, D_{1A})$, $(RSSI_{1B}, D_{1B})$, and $(RSSI_{1C}, D_{1C})$, shown in FIG. 5. In a step 1106, an RSSI-to-distance relationship model is established, based, at least in part, on the plurality of RSSI-to-distance data pairs. For example, model selector block 504 shown in FIG. 5 may select the predetermined RSSI-to-distance relationship model, based on RSSI values $RSSI_{1A}$, $RSSI_{1B}$, and $RSSI_{1C}$, etc. and distance values $D_{1A}$, $D_{1B}$, and $D_{1C}$, etc. In a step 1108, at the receiving device, an additional V2X message may be received from a transmitting device different from the plurality of transmitting devices. For example, BSM message $BSM_2$ may be received from pedestrian 108 shown in FIG. 1. In a step 1110, an additional RSSI-to-distance data pair may be obtained for the additional V2X message. For example, such an RSSI-to-distance data pair may be $(RSSI_2, D_2)$, shown in FIG. 5. In a step 1112, the additional RSSI-to-distance data pair may be compared to the RSSI-to-distance relationship model. Such a comparison may be made by the model conformance evaluator block 506 in FIG. 5, for example. Finally, in a step 1114, in response to determining that the additional RSSI-to-distance data pair fails a criterion for conforming to the RSSI-to-distance relationship model, the additional V2X message may be identified as an abnormal transmission. Such an identification of the abnormal transmission may be made by the model conformance evaluator block 506 in FIG. 5.

Figure 12:
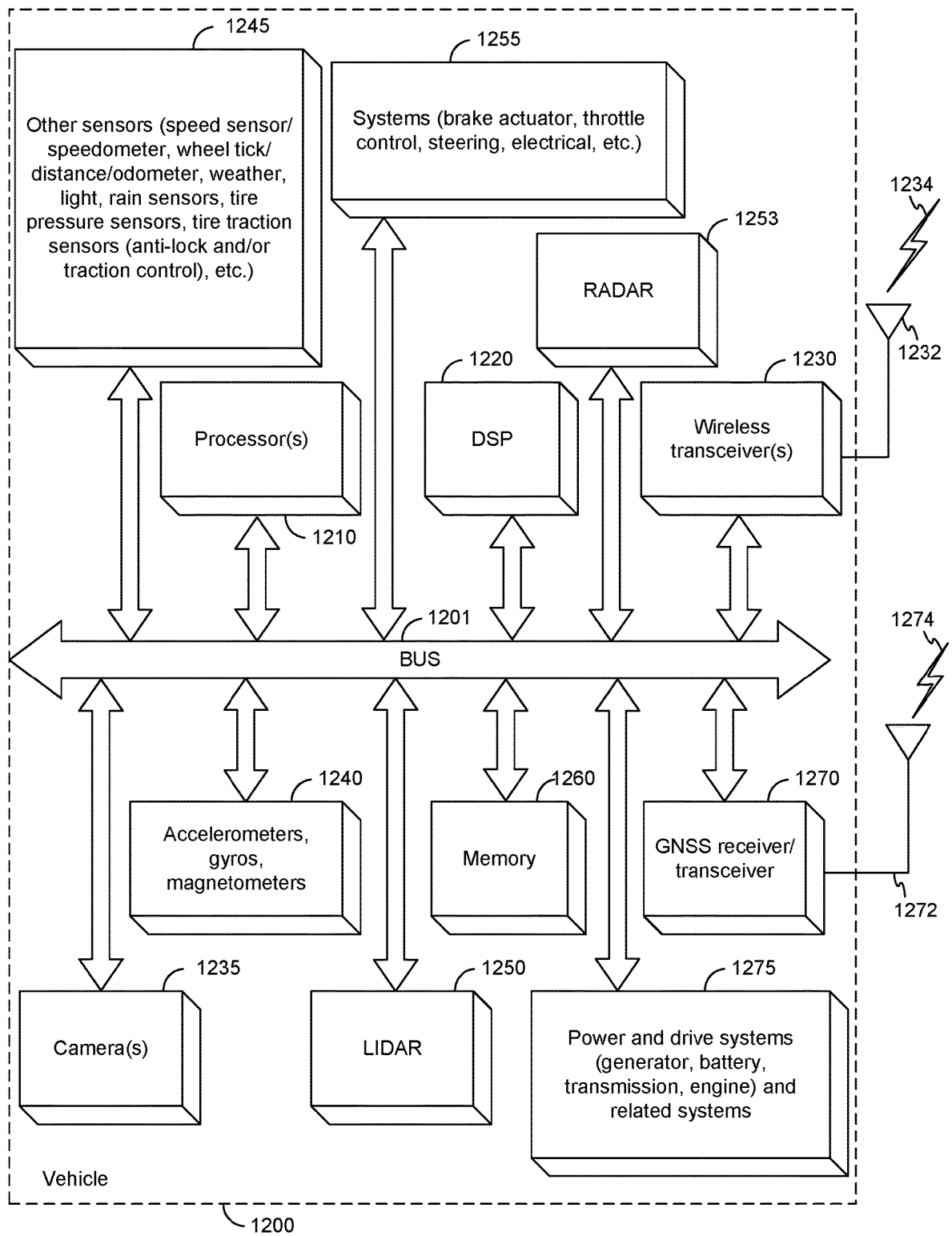
FIG. 12 is a block diagram of various hardware and software components of a vehicle, according to an embodiment.

FIG. 12 is a block diagram of various hardware and software components of a vehicle 1200, according to an embodiment. An example of vehicle 1200 may be vehicle 102 shown in FIG. 1. Vehicle 1200 may comprise communication device such as communications device 400 shown in FIG. 4. While a vehicle is described here for illustrative purposes, other transceiver receiving V2X communications, such as a device carried by a pedestrian or an infrastructure component, may implement the disclosed techniques for identifying abnormal transmissions. Returning to FIG. 12, vehicle 1200 may comprise for example, a car, truck, motorcycle and/or other motorized vehicle, may transmit radio signals to, and receive radio signals from, other vehicles, for example, via V2X car to car communication, and/or from a wireless communication network, base station, and/or wireless access point, etc. In one example, vehicle 1200 may communicate, via wireless transceiver(s) 1230 and wireless antenna(s) 1232 with other vehicles and/or wireless communication networks by transmitting wireless signals to, or receiving wireless signals from a remote wireless transceiver which may comprise another vehicle, a base station (e.g., a NodeB, eNodeB, or gNodeB) or wireless access point, over a wireless communication link.

Similarly, vehicle 1200 may transmit wireless signals to, or receive wireless signals from a local transceiver over a wireless communication link, for example, by using a WLAN and/or a PAN wireless transceiver, here represented by one of wireless transceiver(s) 1230 and wireless antenna(s) 1232. In an embodiment, wireless transceiver(s) 1230 may comprise various combinations of WAN, WLAN, and/or PAN transceivers. In an embodiment, wireless transceiver(s) 1230 may also comprise a Bluetooth transceiver, a ZigBee transceiver, or other PAN transceiver. In an embodiment, vehicle 1200 may transmit wireless signals to, or receive wireless signals from a wireless transceiver 1230 on a vehicle 1200 over wireless communication link 1234. A local transceiver, a WAN wireless transceiver and/or a mobile wireless transceiver may comprise a WAN transceiver, an access point (AP), femtocell, Home Base Station, small cell base station, HNB, HeNB, or gNodeB and may provide access to a wireless local area network (WLAN, e.g., IEEE 802.11 network), a wireless personal area network (PAN, e.g., Bluetooth network) or a cellular network (e.g., an LTE network or other wireless wide area network such as those discussed in the next paragraph). Of course, it should be understood that these are merely examples of networks that may communicate with a vehicle over a wireless link, and claimed subject matter is not limited in this respect. It is also understood that wireless transceiver(s) 1230 may be located on various types of vehicles 1200, such as boats, ferries, cars, buses, drones, and various transport vehicles. In an embodiment, the vehicle 1200 may be utilized for passenger transport, package transport or other purposes. In an embodiment, GNSS signals 1274 from GNSS Satellites are utilized by vehicle 1200 for location determination and/or for the determination of GNSS signal parameters and demodulated data. In an embodiment, signals 1234 from WAN transceiver(s), WLAN and/or PAN local transceivers are used for location determination, alone or in combination with GNSS signals 1274.

Examples of network technologies that may support wireless transceivers 1230 are GSM, CDMA, WCDMA, LTE, 5G or New Radio Access Technology (NR), HRPD, and V2X car-to-car communication. As noted, V2X communication protocols may be defined in various standards such as SAE and ETS-ITS standards. GSM, WCDMA and LTE are technologies defined by 3GPP. CDMA and HRPD are technologies defined by the 3rd Generation Partnership Project II (3GPP2). WCDMA is also part of the Universal Mobile Telecommunications System (UMTS) and may be supported by an HNB.

Wireless transceivers 1230 may communicate with communications networks via WAN wireless base stations which may comprise deployments of equipment providing subscriber access to a wireless telecommunication network for a service (e.g., under a service contract). Here, a WAN wireless base station may perform functions of a WAN or cell base station in servicing subscriber devices within a cell determined based, at least in part, on a range at which the WAN wireless base station is capable of providing access service. Examples of WAN base stations include GSM, WCDMA, LTE, CDMA, HRPD, Wi-Fi, Bluetooth, WiMAX, 5G NR base stations. In an embodiment, further wireless base stations may comprise a WLAN and/or PAN transceiver.

In an embodiment, vehicle 1200 may contain one or more cameras 1235. In an embodiment, the camera may comprise a camera sensor and mounting assembly. Different mounting assemblies may be used for different cameras on vehicle 1200. For example, front facing cameras may be mounted in the front bumper, in the stem of the rear-view mirror assembly or in other front facing areas of the vehicle 1200. Rear facing cameras may be mounted in the rear bumper/fender, on the rear windshield, on the trunk or other rear facing areas of the vehicle. The side facing mirrors may be mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modified accordingly to update estimated parameters based on camera and other sensor measurements).

Accelerometers, gyros and magnetometers 1240, in an embodiment, may be utilized to provide and/or verify motion and directional information. Accelerometers and gyros may be utilized to monitor wheel and drive train performance. Accelerometers, in an embodiment, may also be utilized to verify actual time of impact with road hazards such as pot holes relative to predicted times based on existing stopping and acceleration models as well as steering models. Gyros and magnetometers may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors 1245 such as speed sensors, wheel tick sensors, and/or odometer measurements.

LIDAR 1250 uses pulsed laser light to measure ranges to objects. While cameras may be used for object detection, LIDAR 1250 provides a means, to detect the distances (and orientations) of the objects with more certainty, especially in regard to objects of unknown size and shape. LIDAR 1250 measurements may also be used to estimate rate of travel, vector directions, relative position and stopping distance by providing accurate distance measurements and delta distance measurements.

Memory 1260 may be utilized with processor 1210 and/or DSP 1220, which may comprise Random Access Memory (RAM), Read-Only Memory (ROM), disc drive, FLASH, or other memory devices or various combinations thereof. In an embodiment, memory 1260 may contain instructions to implement various methods described throughout this description including, for example, processes to implement the use of relative positioning between vehicles and between vehicles and external reference objects such as roadside units. In an embodiment, memory may contain instructions for operating and calibrating sensors, and for receiving map, weather, vehicular (both vehicle 1200 and surrounding vehicles, e.g., HV 110 and RVs 130) and other data, and utilizing various internal and external sensor measurements and received data and measurements to determine driving parameters such as relative position, absolute position, stopping distance, acceleration and turning radius at current speed and/or maneuverability at current speed, inter-car distance, turn initiation/timing and performance, and initiation/timing of driving operations.

In an embodiment, power and drive systems (generator, battery, transmission, engine) and related systems 1275 and systems (brake, actuator, throttle control, steering, and electrical) 1255 may be controlled by the processor(s) and/or hardware or software or by an operator of the vehicle or by some combination thereof. The systems (brake, actuator, throttle control, steering, electrical, etc.) 1255 and power and drive or other systems 1275 may be utilized in conjunction with performance parameters and operational parameters, to enable autonomously (and manually, relative to alerts and emergency overrides/braking/stopping) driving and operating a vehicle 1200 safely and accurately, such as to safely, effectively and efficiently merge into traffic, stop, accelerate and otherwise operate the vehicle 1200. In an embodiment, input from the various sensor systems such as camera 1235, accelerometers, gyros and magnetometers 1240, LIDAR 1250, GNSS receiver/transceiver/transceiver 1270, RADAR 1253, input, messaging and/or measurements from wireless transceiver(s) 1230 and/or other sensors 1245 or various combinations thereof, may be utilized by processor 1210 and/or DSP 1220 or other processing systems to control power and drive systems 1275 and systems (brake actuator, throttle control, steering, electrical, etc.) 1255.

A global navigation satellite system (GNSS) receiver 1270 may be utilized to determine position relative to the earth (absolute position) and, when used with other information such as measurements from other objects and/or mapping data, to determine position relative to other objects such as relative to other vehicles and/or relative to the road surface. To determine position, the GNSS receiver/transceiver/transceiver 1270, may receive RF signals 1274 from GNSS satellites (e.g., RF signals 812 from GNSS satellites 810) using one or more antennas 1272 (which, depending on functional requirements, may be the same as antennas 1232). The GNSS receiver/transceiver/transceiver 1270 may support one or more GNSS constellations as well as other satellite-based navigation systems. For example, in an embodiment, GNSS receiver/transceiver/transceiver 1270 may support global navigation satellite systems such as GPS, the GLONASS, Galileo, and/or BeiDou, or any combination thereof. In an embodiment, GNSS receiver/transceiver 1270 may support regional navigation satellite systems such as NavIC or QZSS or a combination thereof as well as various augmentation systems (e.g., Satellite Based Augmentation Systems (SBAS) or ground based augmentation systems (GBAS)) such as Doppler Orbitography and Radio-positioning Integrated by Satellite (DORIS) or wide area augmentation system (WAAS) or the European geostationary navigation overlay service (EGNOS) or the multifunctional satellite augmentation system (MSAS) or the local area augmentation system (LAAS). In an embodiment, GNSS receiver/transceiver(s) 1230 and antenna(s) 1232 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver/transceiver 1270 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared Doppler and/or pseudorange measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR and other distance estimation techniques. GNSS Doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from RSUs, to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an RSU equipped with GNSS receiver/transceiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

RADAR 1253, uses transmitted radio waves that are reflected off of objects. The reflected radio waves are analyzed, based on the time taken for reflections to arrive and other signal characteristics of the reflected waves to determine the location of nearby objects. RADAR 1253 may be utilized to detect the location of nearby cars, roadside objects (signs, other vehicles, pedestrians, etc.) and will generally enable detection of objects even if there is obscuring weather such as snow, rail or hail. Thus, RADAR 1253 may be used to complement LIDAR 1250 systems and camera 1235 systems in providing ranging information to other objects by providing ranging and distance measurements and information when visual-based systems typically fail. Furthermore, RADAR 1253 may be utilized to calibrate and/or sanity check other systems such as LIDAR 1250 and camera 1235. Ranging measurements from RADAR 1253 may be utilized to determine/measure stopping distance at current speed, acceleration, maneuverability at current speed and/or turning radius at current speed and/or a measure of maneuverability at current speed. In some systems, ground penetrating RADAR may also be used to track road surfaces via, for example, RADAR-reflective markers on the road surface or terrain features such as ditches.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., memory 1260 of FIG. 12) can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. The term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

Implementation examples are described in the following numbered clauses:

Clause 1. A method for abnormal transmission identification, comprising:

at a receiving device, receiving a plurality of V2X messages from a plurality of transmitting devices;

obtaining a plurality of RSSI-to-distance data pairs, including an RSSI-to-distance data pair for each of the plurality of V2X messages;

establishing an RSSI-to-distance relationship model based, at least in part, on the plurality of RSSI-to-distance data pairs;

at the receiving device, receiving an additional V2X message from a transmitting device different from the plurality of transmitting devices;

obtaining an additional RSSI-to-distance data pair for the additional V2X message;

comparing the additional RSSI-to-distance data pair to the RSSI-to-distance relationship model; and in response to determining that the additional RSSI-to-distance data pair fails a criterion for conforming to the RSSI-to-distance relationship model, identifying the additional V2X message as an abnormal transmission.

Clause 2. The method of clause 1, wherein establishing the RSSI-to-distance relationship model comprises selecting a predetermined RSSI-to-distance relationship model from a plurality of predetermined RSSI-to-distance relationship models.

Clause 3. The method of clause 2, wherein the selecting the predetermined RSSI-to-distance relationship model from the plurality of predetermined RSSI-to-distance relationship models comprises:

for each predetermined RSSI-to-distance relationship model from the plurality of predetermined RSSI-to-distance relationship models, applying a chi-square test to evaluate a fit between (1) the plurality of RSSI-to-distance data pairs for the plurality of V2X messages and (2) the predetermined RSSI-to-distance relationship model, to generate a fit score; and based on the fit score for each predetermined RSSI-to-distance relationship model from the plurality of predetermined RSSI-to-distance relationship models, choosing the selected, predetermined RSSI-to-distance relationship model as a best-fitting model.

Clause 4. The method of clause 2 or 3, wherein the plurality of predetermined RSSI-to-distance relationship models correspond to a plurality of signal propagation contexts.

Clause 5. The method of clause 4, wherein the plurality of predetermined RSSI-to-distance relationship models include at least one of: a city simple path loss model, a highway simple path loss model, a city two-ray model, or a city breakpoint model.

Clause 6. The method of any of clauses 2-5, wherein selection of the predetermined RSSI-to-distance relationship model is repeatedly performed based on a time schedule.

Clause 7. The method of any of clauses 2-5, wherein selection of the predetermined RSSI-to-distance relationship model is repeatedly performed based on an event trigger.

Clause 8. The method of any of clauses 1-7, wherein:

each of the plurality of RSSI-to-distance data pairs comprises (1) a received signal strength indicator (RSSI) value and (2) an estimated distance between the receiving device and a transmitting device of the V2X message, the additional RSSI-to-distance data pair comprises (1) an RSSI value and (2) an estimated distance between the receiving device and the transmitting device of the additional V2X message.

Clause 9. The method of clause 8 wherein, for each V2X message of the plurality of V2X messages and the additional V2X message:

the V2X message comprises a Basic Safety Message (BSM), Cooperative Awareness Message (CAM), and/or Decentralized Environmental Notification Message (DENM), the RSSI value is associated with reception of the BSM/CAM/DENM message, and the estimated distance is based in part on location data contained in the BSM/CAM/DENM message.

Clause 10. The method of clause 9, wherein the estimated distance is computed from (1) the location data contained in the BSM/CAM/DENM message and (2) a location fix for the receiving device.

Clause 11. The method of any of clauses 1-10, wherein the determining that the additional RSSI-to-distance data pair fails the criterion for conforming to the RSSI-to-distance relationship model comprises:

establishing, for an estimated distance for the additional V2X message, an upper RSSI value and a lower RSSI value corresponding to the RSSI-to-distance relationship model; and determining that an RSSI value for the additional V2X message falls outside an RSSI range established by the upper RSSI value and the lower RSSI value.

Clause 12. The method of any of clauses 1-11, wherein the receiving device is part of a vehicular system.

Clause 13. The method of any of clauses 1-11, wherein the receiving device is part of an infrastructure system.

Clause 14. The method of any of clauses 1-11, wherein the receiving device is part of a mobile device carried by a pedestrian.

Clause 15. The method of any of clauses 1-14, further comprising:

detecting an object in a vicinity of the transmitting device or the receiving device based on readings obtained from one or more sensors, wherein the criterion for conforming to the RSSI-to-distance relationship model is based, at least in part, on detecting the object in the vicinity of the transmitting device or the receiving device.

Clause 16. The method of clause 15, wherein detecting the object in the vicinity of the transmitting device or the receiving device comprises determining that the object obstructs a line of sight (LOS) between the transmitting device and the receiving device.

Clause 17. The method of clause 15, wherein the criterion for conforming to the RSSI-to-distance relationship model is associated with an RSSI range, and the RSSI range is expanded or shifted in response to detecting the object in the vicinity of the transmitting device or the receiving device.

Clause 18. A method for abnormal transmission identification, comprising:

at a receiving device, receiving a plurality of V2X messages from a plurality of transmitting devices, wherein the plurality of V2X messages correspond to a plurality of RSSI-to-distance data pairs, including an RSSI-to-distance data pair for each of the plurality of V2X messages, wherein the plurality of RSSI-to-distance data pairs correspond to an RSSI-to-distance relationship model;

at the receiving device, receiving an additional V2X message from a transmitting device different from the plurality of transmitting devices, wherein the additional V2X message corresponds to an additional RSSI-to-distance data pair, and the additional RSSI-to-distance data pair fails a criterion for conforming to the RSSI-to-distance relationship model; and at the receiving device, identifying the additional V2X message as an abnormal transmission.

Clause 19. An apparatus for abnormal transmission identification, comprising:

a receive radio unit configured to receive a plurality of V2X messages from a plurality of transmitting devices and receive an additional V2X message from a transmitting device different from the plurality of transmitting devices; and one or more processors configured to:

obtain a plurality of RSSI-to-distance data pairs, including an RSSI-to-distance data pair for each of the plurality of V2X messages;

establish an RSSI-to-distance relationship model based, at least in part, on the plurality of RSSI-to-distance data pairs;

obtain an additional RSSI-to-distance data pair for the additional V2X message;

compare the additional RSSI-to-distance data pair to the RSSI-to-distance relationship model; and in response to determining that the additional RSSI-to-distance data pair fails a criterion for conforming to the RSSI-to-distance relationship model, identify the additional V2X message as an abnormal transmission.

Clause 20. The apparatus of clause 19, wherein the one or more processors are configured to establish the RSSI-to-distance relationship model by selecting a predetermined RSSI-to-distance relationship model from a plurality of predetermined RSSI-to-distance relationship models.

Clause 21. The apparatus of clause 20, wherein the one or more processors are configured to select the predetermined RSSI-to-distance relationship model from the plurality of predetermined RSSI-to-distance relationship models by:

for each predetermined RSSI-to-distance relationship model from the plurality of predetermined RSSI-to-distance relationship models, applying a chi-square test to evaluate a fit between (1) the plurality of RSSI-to-distance data pairs for the plurality of V2X messages and (2) the predetermined RSSI-to-distance relationship model, to generate a fit score; and based on the fit score for each predetermined RSSI-to-distance relationship model from the plurality of predetermined RSSI-to-distance relationship models, choosing the selected, predetermined RSSI-to-distance relationship model as a best-fitting model.

Clause 22. The apparatus of clause 20 or 21, wherein the plurality of predetermined RSSI-to-distance relationship models correspond to a plurality of signal propagation contexts.

Clause 23. The apparatus of clause 22, wherein the plurality of predetermined RSSI-to-distance relationship models include at least one of: a city simple path loss model, a highway simple path loss model, a city two-ray model, or a city breakpoint model.

Clause 24. The apparatus of any of clauses 20-23, wherein the one or more processors are configured to repeated select the predetermined RSSI-to-distance relationship model, based on a time schedule.

Clause 25. The apparatus of any of clauses 20-23, wherein the one or more processors are configured to repeated select the predetermined RSSI-to-distance relationship model, based on an event trigger.

Clause 26. The apparatus of any of clauses 19-25, wherein:

each of the plurality of RSSI-to-distance data pairs comprises (1) a received signal strength indicator (RSSI) value and (2) an estimated distance between the apparatus and a transmitting device of the V2X message, the additional RSSI-to-distance data pair comprises (1) an RSSI value and (2) an estimated distance between the apparatus and the transmitting device of the additional V2X message.

Clause 27. The apparatus of clause 26 wherein, for each V2X message of the plurality of V2X messages and the additional V2X message:

the V2X message comprises a Basic Safety Message (BSM), Cooperative Awareness Message (CAM), and/or Decentralized Environmental Notification Message (DENM), the RSSI value is associated with reception of the BSM/CAM/DENM message, and the estimated distance is based in part on location data contained in the BSM/CAM/DENM message.

Clause 28. The apparatus of clause 27, wherein the one or more processors are configured to compute the estimated distance from (1) the location data contained in the BSM/CAM/DENM message and (2) a location fix for the apparatus.

Clause 29. The apparatus of any of clauses 19-28, wherein the one or more processors are configured to determine that the additional RSSI-to-distance data pair fails the criterion for conforming to the RSSI-to-distance relationship, by:

establishing, for an estimated distance for the additional V2X message, an upper RSSI value and a lower RSSI value corresponding to the RSSI-to-distance relationship model; and determining that an RSSI value for the additional V2X message falls outside an RSSI range established by the upper RSSI value and the lower RSSI value.

Clause 30. The apparatus of any of clauses 19-29, wherein the apparatus is part of a vehicular system.

Clause 31. The apparatus of any of clauses 19-29, wherein the apparatus is part of an infrastructure system.

Clause 32. The apparatus of any of clauses 19-29, wherein the apparatus is part of a mobile device carried by a pedestrian.

Clause 33. The apparatus of any of clauses 19-32, further comprising:

detecting an object in a vicinity of the transmitting device or the apparatus based on readings obtained from one or more sensors, wherein the criterion for conforming to the RSSI-to-distance relationship model is based, at least in part, on detecting the object in the vicinity of the transmitting device or the apparatus.

Clause 34. The apparatus of clause 33, wherein detecting the object in the vicinity of the transmitting device or the apparatus comprises determining that the object obstructs a line of sight (LOS) between the transmitting device and the apparatus.

Clause 35. The apparatus of clause 33, wherein the criterion for conforming to the RSSI-to-distance relationship model is associated with an RSSI range, and the RSSI range is expanded or shifted in response to detecting the object in the vicinity of the transmitting device or the apparatus.

Clause 36. An apparatus for abnormal transmission identification, comprising:

a receive radio unit configured to receive a plurality of V2X messages from a plurality of transmitting devices and receive an additional V2X message from a transmitting device different from the plurality of transmitting devices, wherein:

the plurality of V2X messages correspond to a plurality of RSSI-to-distance data pairs, including an RSSI-to-distance data pair for each of the plurality of V2X messages, the plurality of RSSI-to-distance data pairs correspond to an RSSI-to-distance relationship model, and the additional V2X message corresponds to an additional RSSI-to-distance data pair, and the additional RSSI-to-distance data pair fails a criterion for conforming to the RSSI-to-distance relationship model; and one or more processors configured to identify the additional V2X message as an abnormal transmission.

Clause 37. A system for abnormal transmission identification, comprising:

means for, at a receiving device, receiving a plurality of V2X messages from a plurality of transmitting devices;

means for obtaining a plurality of RSSI-to-distance data pairs, including an RSSI-to-distance data pair for each of the plurality of V2X messages;

means for establishing an RSSI-to-distance relationship model based, at least in part, on the plurality of RSSI-to-distance data pairs;

means for, at the receiving device, receiving an additional V2X message from a transmitting device different from the plurality of transmitting devices;

means for obtaining an additional RSSI-to-distance data pair for the additional V2X message;

means for comparing the additional RSSI-to-distance data pair to the RSSI-to-distance relationship model; and means for, in response to determining that the additional RSSI-to-distance data pair fails a criterion for conforming to the RSSI-to-distance relationship model, identifying the additional V2X message as an abnormal transmission Clause 38. The system of clause 37, wherein the means for establishing the RSSI-to-distance relationship model comprises means for selecting a predetermined RSSI-to-distance relationship model from a plurality of predetermined RSSI-to-distance relationship models.

Clause 39. The system of clause 38, wherein the means for selecting the predetermined RSSI-to-distance relationship model from the plurality of predetermined RSSI-to-distance relationship models comprises:

means for, for each predetermined RSSI-to-distance relationship model from the plurality of predetermined RSSI-to-distance relationship models, applying a chi-square test to evaluate a fit between (1) the plurality of RSSI-to-distance data pairs for the plurality of V2X messages and (2) the predetermined RSSI-to-distance relationship model, to generate a fit score; and means for, based on the fit score for each predetermined RSSI-to-distance relationship model from the plurality of predetermined RSSI-to-distance relationship models, choosing the selected, predetermined RSSI-to-distance relationship model as a best-fitting model.

Clause 40. The system of clause 38 or 39, wherein the plurality of predetermined RSSI-to-distance relationship models correspond to a plurality of signal propagation contexts.

41. A non-transitory computer-readable medium storing instructions therein for execution by one or more processing units, comprising instructions to:

at a receiving device, receive a plurality of V2X messages from a plurality of transmitting devices;

obtain a plurality of RSSI-to-distance data pairs, including an RSSI-to-distance data pair for each of the plurality of V2X messages;

establish an RSSI-to-distance relationship model based, at least in part, on the plurality of RSSI-to-distance data pairs;

at the receiving device, receive an additional V2X message from a transmitting device different from the plurality of transmitting devices;

obtain an additional RSSI-to-distance data pair for the additional V2X message;

compare the additional RSSI-to-distance data pair to the RSSI-to-distance relationship model; and in response to determining that the additional RSSI-to-distance data pair fails a criterion for conforming to the RSSI-to-distance relationship model, identify the additional V2X message as an abnormal transmission Clause 42. The non-transitory computer-readable medium of clause 41, wherein the instructions to establish the RSSI-to-distance relationship model comprise instructions to select a predetermined RSSI-to-distance relationship model from a plurality of predetermined RSSI-to-distance relationship models.

Clause 43. The non-transitory computer-readable medium of clause 42, wherein the instructions to select the predetermined RSSI-to-distance relationship model from the plurality of predetermined RSSI-to-distance relationship models comprise instructions to:

for each predetermined RSSI-to-distance relationship model from the plurality of predetermined RSSI-to-distance relationship models, apply a chi-square test to evaluate a fit between (1) the plurality of RSSI-to-distance data pairs for the plurality of V2X messages and (2) the predetermined RSSI-to-distance relationship model, to generate a fit score; and based on the fit score for each predetermined RSSI-to-distance relationship model from the plurality of predetermined RSSI-to-distance relationship models, choose the selected, predetermined RSSI-to-distance relationship model as a best-fitting model.

Clause 44. The non-transitory computer-readable medium of clause 42 or 43, wherein the plurality of predetermined RSSI-to-distance relationship models correspond to a plurality of signal propagation contexts.

What is claimed is:

1. A method for abnormal transmission identification, comprising:
    at a receiving device, receiving a plurality of V2X messages from a plurality of transmitting devices;
    obtaining a plurality of RSSI-to-distance data pairs, including an RSSI-to-distance data pair for each of the plurality of V2X messages, each of the plurality of RSSI-to-distance data pairs comprising (1) a received signal strength indicator (RSSI) value and (2) an estimated distance between the receiving device and a corresponding one of the plurality of transmitting devices;
    establishing an RSSI-to-distance relationship model based, at least in part, on the plurality of RSSI-to-distance data pairs;
    at the receiving device, receiving an additional V2X message from a transmitting device different from the plurality of transmitting devices;
    obtaining an additional RSSI-to-distance data pair for the additional V2X message, the additional RSSI-to-distance pair comprising (1) an RSSI value and (2) an estimated distance between the receiving device and the transmitting device of the additional V2X message computed from (a) location data contained in the additional V2X message and (b) a location fix for the receiving device;
    comparing the additional RSSI-to-distance data pair to the RSSI-to-distance relationship model; and
    in response to determining that the additional RSSI-to-distance data pair fails a criterion for conforming to the RSSI-to-distance relationship model, identifying the additional V2X message as an abnormal transmission.

2. The method of claim 1, wherein establishing the RSSI-to-distance relationship model comprises selecting a predetermined RSSI-to-distance relationship model from a plurality of predetermined RSSI-to-distance relationship models.

3. The method of claim 2, wherein the selecting the predetermined RSSI-to-distance relationship model from the plurality of predetermined RSSI-to-distance relationship models comprises:
    for each predetermined RSSI-to-distance relationship model from the plurality of predetermined RSSI-to-distance relationship models, applying a chi-square test to evaluate a fit between (1) the plurality of RSSI-to-distance data pairs for the plurality of V2X messages and (2) the predetermined RSSI-to-distance relationship model, to generate a fit score; and
    based on the fit score for each predetermined RSSI-to-distance relationship model from the plurality of predetermined RSSI-to-distance relationship models, choosing the selected, predetermined RSSI-to-distance relationship model as a best-fitting model.

4. The method of claim 2, wherein the plurality of predetermined RSSI-to-distance relationship models correspond to a plurality of signal propagation contexts.

5. The method of claim 4, wherein the plurality of predetermined RSSI-to-distance relationship models include at least one of: a city simple path loss model, a highway simple path loss model, a city two-ray model, or a city breakpoint model.

6. The method of claim 2, wherein selection of the predetermined RSSI-to-distance relationship model is repeatedly performed based on a time schedule.

7. The method of claim 2, wherein selection of the predetermined RSSI-to-distance relationship model is repeatedly performed based on an event trigger.

8. The method of claim 1 wherein, for each V2X message of the plurality of V2X messages and the additional V2X message:
    the V2X message comprises a Basic Safety Message (BSM), Cooperative Awareness Message (CAM), and/or Decentralized Environmental Notification Message (DENM),
    the RSSI value is associated with reception of the BSM/CAM/DENM message, and
    the estimated distance is based in part on location data contained in the BSM/CAM/DENM message.

9. The method of claim 1, wherein the determining that the additional RSSI-to-distance data pair fails the criterion for conforming to the RSSI-to-distance relationship model comprises:
    establishing, for an estimated distance for the additional V2X message, an upper RSSI value and a lower RSSI value corresponding to the RSSI-to-distance relationship model; and
    determining that an RSSI value for the additional V2X message falls outside an RSSI range established by the upper RSSI value and the lower RSSI value.

10. The method of claim 1, further comprising:
    detecting an object in a vicinity of the transmitting device or the receiving device based on readings obtained from one or more sensors,
    wherein the criterion for conforming to the RSSI-to-distance relationship model is based, at least in part, on detecting the object in the vicinity of the transmitting device or the receiving device.

11. The method of claim 10, wherein detecting the object in the vicinity of the transmitting device or the receiving device comprises determining that the object obstructs a line of sight (LOS) between the transmitting device and the receiving device.

12. The method of claim 10, wherein the criterion for conforming to the RSSI-to-distance relationship model is associated with an RSSI range, and
    the RSSI range is expanded or shifted in response to detecting the object in the vicinity of the transmitting device or the receiving device.

13. A method for abnormal transmission identification, comprising:
    at a receiving device, receiving a plurality of V2X messages from a plurality of transmitting devices,
    wherein the plurality of V2X messages correspond to a plurality of RSSI-to-distance data pairs, including an RSSI-to-distance data pair for each of the plurality of V2X messages, each of the plurality of RSSI-to-distance data pairs comprising (1) a received signal strength indicator (RSSI) value and (2) an estimated distance between the receiving device and a corresponding one of the plurality of transmitting devices, wherein the plurality of RSSI-to-distance data pairs correspond to an RSSI-to-distance relationship model;
at the receiving device, receiving an additional V2X message from a transmitting device different from the plurality of transmitting devices,
wherein the additional V2X message corresponds to an additional RSSI-to-distance data pair comprising (1) an RSSI value and (2) an estimated distance between the receiving device and the transmitting device of the additional V2X message computed from (a) location data contained in the additional V2X message and (b) a location fix for the receiving device, and the additional RSSI-to-distance data pair fails a criterion for conforming to the RSSI-to-distance relationship model; and
at the receiving device, identifying the additional V2X message as an abnormal transmission.

14. An apparatus for abnormal transmission identification, comprising:
a receive radio unit configured to receive a plurality of V2X messages from a plurality of transmitting devices and receive an additional V2X message from a transmitting device different from the plurality of transmitting devices; and
one or more processors configured to:
obtain a plurality of RSSI-to-distance data pairs, including an RSSI-to-distance data pair for each of the plurality of V2X messages, each of the plurality of RSSI-to-distance data pairs comprising (1) a received signal strength indicator (RSSI) value and (2) an estimated distance between the receiving device and a corresponding one of the plurality of transmitting devices;
establish an RSSI-to-distance relationship model based, at least in part, on the plurality of RSSI-to-distance data pairs;
obtain an additional RSSI-to-distance data pair for the additional V2X message, the additional RSSI-to-distance pair comprising (1) an RSSI value and (2) an estimated distance between the receiving device and the transmitting device of the additional V2X message computed from (a) location data contained in the additional V2X message and (b) a location fix for the receiving device;
compare the additional RSSI-to-distance data pair to the RSSI-to-distance relationship model; and
in response to determining that the additional RSSI-to-distance data pair fails a criterion for conforming to the RSSI-to-distance relationship model, identify the additional V2X message as an abnormal transmission.

15. The apparatus of claim 1, wherein the one or more processors are configured to establish the RSSI-to-distance relationship model by selecting a predetermined RSSI-to-distance relationship model from a plurality of predetermined RSSI-to-distance relationship models.

16. The apparatus of claim 15, wherein the one or more processors are configured to select the predetermined RSSI-to-distance relationship model from the plurality of predetermined RSSI-to-distance relationship models by:
for each predetermined RSSI-to-distance relationship model from the plurality of predetermined RSSI-to-distance relationship models, applying a chi-square test to evaluate a fit between (1) the plurality of RSSI-to-distance data pairs for the plurality of V2X messages and (2) the predetermined RSSI-to-distance relationship model, to generate a fit score; and
based on the fit score for each predetermined RSSI-to-distance relationship model from the plurality of predetermined RSSI-to-distance relationship models, choosing the selected, predetermined RSSI-to-distance relationship model as a best-fitting model.

17. The apparatus of claim 15, wherein the plurality of predetermined RSSI-to-distance relationship models correspond to a plurality of signal propagation contexts.

18. The apparatus of claim 17, wherein the plurality of predetermined RSSI-to-distance relationship models include at least one of: a city simple path loss model, a highway simple path loss model, a city two-ray model, or a city breakpoint model.

19. The apparatus of claim 15, wherein the one or more processors are configured to repeated select the predetermined RSSI-to-distance relationship model, based on a time schedule.

20. The apparatus of claim 15, wherein the one or more processors are configured to repeated select the predetermined RSSI-to-distance relationship model, based on an event trigger.

21. The apparatus of claim 14 wherein, for each V2X message of the plurality of V2X messages and the additional V2X message:
the V2X message comprises a Basic Safety Message (BSM), Cooperative Awareness Message (CAM), and/or Decentralized Environmental Notification Message (DENM),
the RSSI value is associated with reception of the BSM/CAM/DENM message, and
the estimated distance is based in part on location data contained in the BSM/CAM/DENM message.

22. The apparatus of claim 14, wherein the one or more processors are configured to determine that the additional RSSI-to-distance data pair fails the criterion for conforming to the RSSI-to-distance relationship, by:
establishing, for an estimated distance for the additional V2X message, an upper RSSI value and a lower RSSI value corresponding to the RSSI-to-distance relationship model; and
determining that an RSSI value for the additional V2X message falls outside an RSSI range established by the upper RSSI value and the lower RSSI value.

23. The apparatus of claim 14, further comprising:
detecting an object in a vicinity of the transmitting device or the apparatus based on readings obtained from one or more sensors,
wherein the criterion for conforming to the RSSI-to-distance relationship model is based, at least in part, on detecting the object in the vicinity of the transmitting device or the apparatus.

24. The apparatus of claim 23, wherein detecting the object in the vicinity of the transmitting device or the apparatus comprises determining that the object obstructs a line of sight (LOS) between the transmitting device and the apparatus.

25. The apparatus of claim 23, wherein the criterion for conforming to the RSSI-to-distance relationship model is associated with an RSSI range, and
the RSSI range is expanded or shifted in response to detecting the object in the vicinity of the transmitting device or the apparatus.

26. A system for abnormal transmission identification, comprising:
means for, at a receiving device, receiving a plurality of V2X messages from a plurality of transmitting devices;

means for obtaining a plurality of RSSI-to-distance data pairs, including an RSSI-to-distance data pair for each of the plurality of V2X messages, each of the plurality of RSSI-to-distance data pairs comprising (1) a received signal strength indicator (RSSI) value and (2) an estimated distance between the receiving device and a corresponding one of the plurality of transmitting devices;

means for establishing an RSSI-to-distance relationship model based, at least in part, on the plurality of RSSI-to-distance data pairs;

means for, at the receiving device, receiving an additional V2X message from a transmitting device different from the plurality of transmitting devices;

means for obtaining an additional RSSI-to-distance data pair for the additional V2X message, the additional RSSI-to-distance pair comprising (1) an RSSI value and (2) an estimated distance between the receiving device and the transmitting device of the additional V2X message computed from (a) location data contained in the additional V2X message and (b) a location fix for the receiving device;

means for comparing the additional RSSI-to-distance data pair to the RSSI-to-distance relationship model; and means for, in response to determining that the additional RSSI-to-distance data pair fails a criterion for conforming to the RSSI-to-distance relationship model, identifying the additional V2X message as an abnormal transmission.

* * * * *